United States Patent
Seo et al.

(10) Patent No.: US 8,949,924 B2
(45) Date of Patent: Feb. 3, 2015

(54) MULTI-SCREEN DISPLAY APPARATUS AND METHOD FOR DIGITAL BROADCAST RECEIVER

(75) Inventors: Jeong Wook Seo, Daegu (KR); Jong Kerl Lee, Gumi-si (KR); Wei Jin Park, Seoul (KR)

(73) Assignees: Samsung Electronics Co., Ltd., Yeongtong-gu, Suwon-si, Gyeonggi-do (KR); Wireless Republic Group Inc., Bundang-gu, Seongnam-si, Gyeonggi-do (KR)

( * ) Notice: Subject to any disclaimer, the term of this patent is extended or adjusted under 35 U.S.C. 154(b) by 878 days.

(21) Appl. No.: 11/827,045

(22) Filed: Jul. 9, 2007

(65) Prior Publication Data

US 2008/0022352 A1 Jan. 24, 2008

(30) Foreign Application Priority Data

Jul. 10, 2006 (KR) .................. 10-2006-0064635
Jul. 10, 2006 (KR) .................. 10-2006-0064636

(51) Int. Cl.
*H04N 7/16* (2011.01)
*H04N 7/173* (2011.01)
*H04N 5/45* (2011.01)
*H04N 21/235* (2011.01)
*H04N 21/414* (2011.01)
*H04N 21/431* (2011.01)
(Continued)

(52) U.S. Cl.
CPC ............... *H04N 5/45* (2013.01); *H04N 21/235* (2013.01); *H04N 21/41407* (2013.01); *H04N 21/4316* (2013.01); *H04N 21/4345* (2013.01); *H04N 21/4347* (2013.01); *H04N 21/435* (2013.01); *H04N 21/64315* (2013.01)

USPC ............. 725/151; 725/62; 725/100; 725/131; 725/139

(58) Field of Classification Search
USPC ............. 725/62, 106, 112–113, 90, 100, 131, 725/139, 151; 348/564
See application file for complete search history.

(56) References Cited

U.S. PATENT DOCUMENTS 5,583,652 A * 12/1996 Ware .............................. 386/206
5,901,366 A * 5/1999 Nakano et al. ................ 348/565
(Continued)

FOREIGN PATENT DOCUMENTS

EP 1675399 A2 6/2006
JP 2006-033691 A 2/2006
(Continued)

*Primary Examiner* — Randy Flynn
(74) *Attorney, Agent, or Firm* — Cha & Reiter, LLC

(57) ABSTRACT

A multiplexed display apparatus and method for a digital broadcast receiver are provided. A multi-screen display apparatus for a digital broadcast receiver of the present invention includes a broadcast reception unit for receiving broadcast data of a primary service channel and at least one secondary service channel; a decoding unit comprising a video decoder for decoding video data of all types of video frame of the primary service channel and a predetermined type of video frame of the secondary service channel and an audio decoder for decoding audio data of a predetermined service channel, by time frame; a multiplexed screen processing unit for multiplexing the video data of the primary service channel and the at least one secondary service channel output by the decoding unit; a display unit for displaying the multiplexed video data in the form of multiplexed screen image; and a speaker unit for outputting the decoded audio data in the form of an audible sound wave.

50 Claims, 18 Drawing Sheets

(51) Int. Cl.
*H04N 21/434* (2011.01)
*H04N 21/435* (2011.01)
*H04N 21/643* (2011.01)

(56) References Cited

U.S. PATENT DOCUMENTS

| | | | | |
|---|---|---|---|---|
| 5,909,238 | A * | 6/1999 | Nagashima et al. | 725/8 |
| 6,115,080 | A * | 9/2000 | Reitmeier | 348/564 |
| 6,259,740 | B1 * | 7/2001 | Lyu | 375/240.25 |
| 6,262,776 | B1 * | 7/2001 | Griffits | 348/512 |
| 6,357,045 | B1 * | 3/2002 | Devaney | 725/138 |
| 6,424,361 | B1 * | 7/2002 | Chapuis | 725/52 |
| 6,470,051 | B1 * | 10/2002 | Campisano et al. | 375/240.21 |
| 6,553,178 | B2 * | 4/2003 | Abecassis | 725/101 |
| 6,925,097 | B2 * | 8/2005 | Hagai et al. | 348/423.1 |
| 6,985,188 | B1 * | 1/2006 | Hurst, Jr. | 348/553 |
| 7,263,275 | B2 * | 8/2007 | Demas et al. | 725/89 |
| 7,421,244 | B2 * | 9/2008 | van Rooyen | 725/76 |
| 8,013,938 | B2 * | 9/2011 | Shyu | 725/152 |
| 2002/0174430 | A1 * | 11/2002 | Ellis et al. | 725/88 |
| 2003/0021346 | A1 * | 1/2003 | Bixby et al. | 725/86 |
| 2003/0159143 | A1 * | 8/2003 | Chan | 725/41 |
| 2003/0161395 | A1 * | 8/2003 | Byers | 375/240.01 |
| 2003/0231259 | A1 * | 12/2003 | Yui et al. | 348/564 |
| 2004/0003399 | A1 | 1/2004 | Cooper | |
| 2004/0060061 | A1 * | 3/2004 | Parker | 725/38 |
| 2005/0160069 | A1 * | 7/2005 | Park et al. | 707/1 |
| 2007/0250896 | A1 * | 10/2007 | Parker et al. | 725/135 |

FOREIGN PATENT DOCUMENTS

| | | |
|---|---|---|
| KR | 2003-0064595 A | 8/2003 |
| KR | 10-2005-0081416 A | 8/2005 |
| KR | 2006-0080114 A | 7/2006 |
| WO | 2005-076503 A1 | 8/2005 |
| WO | 2006-057938 A2 | 6/2006 |

* cited by examiner

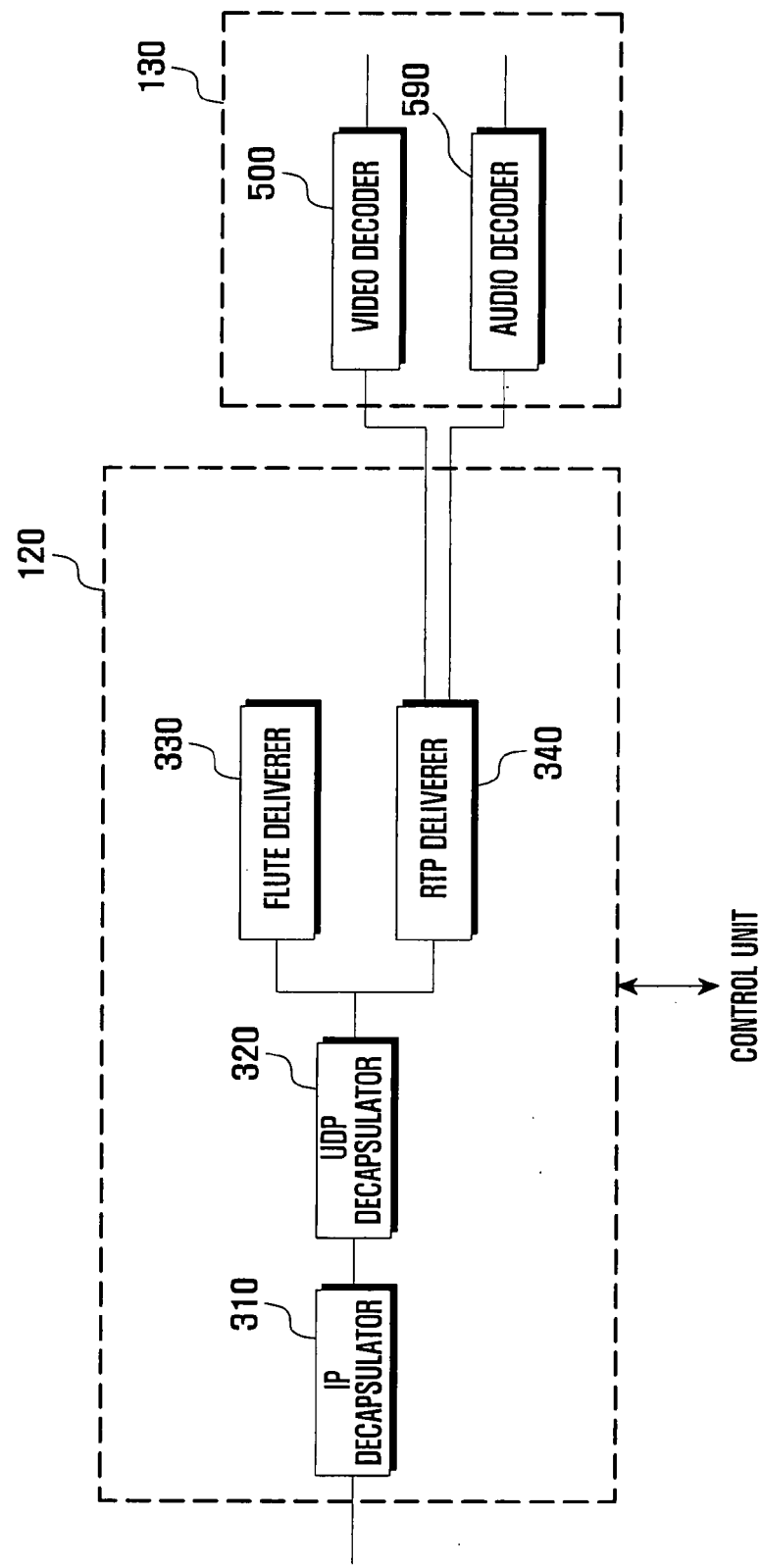

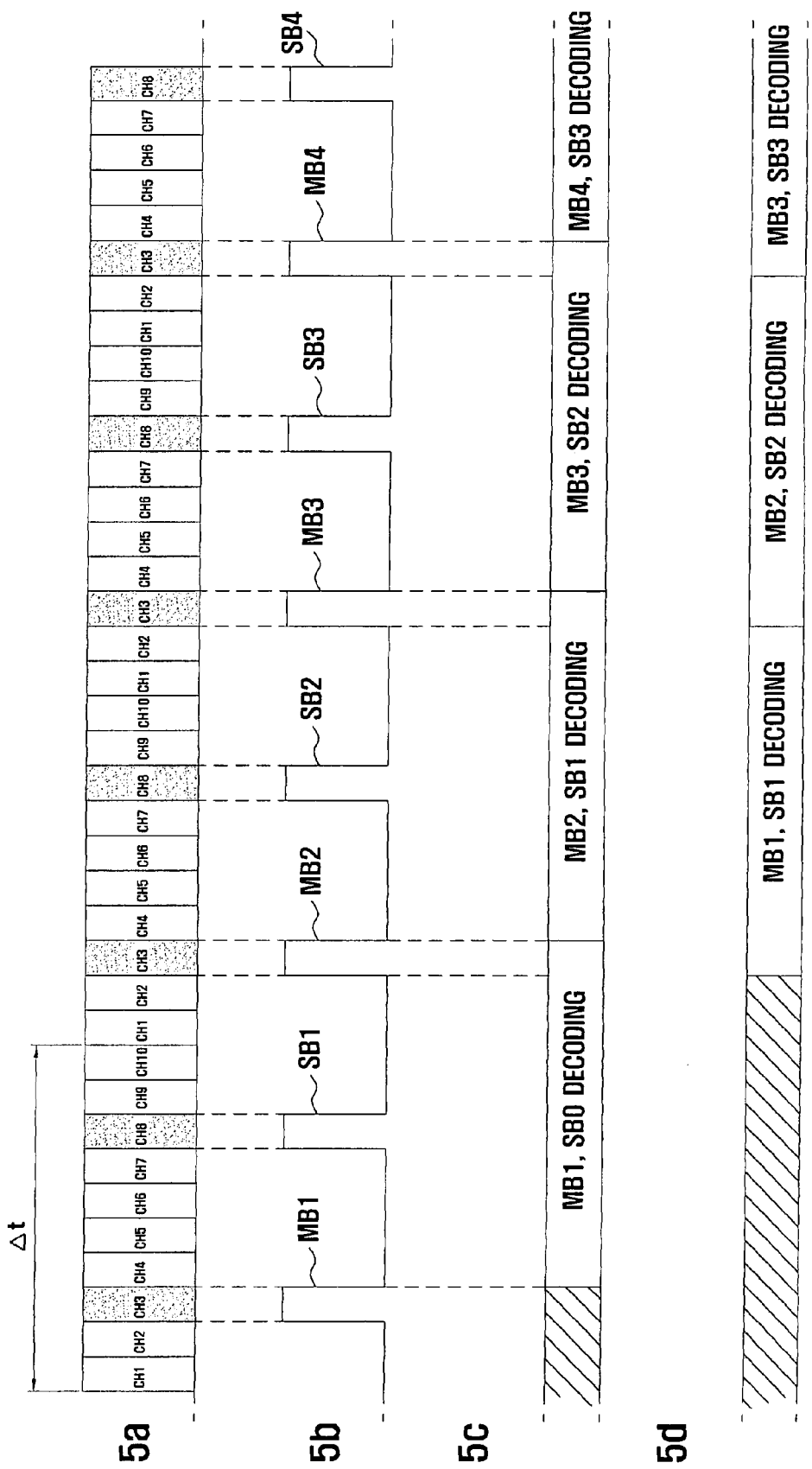

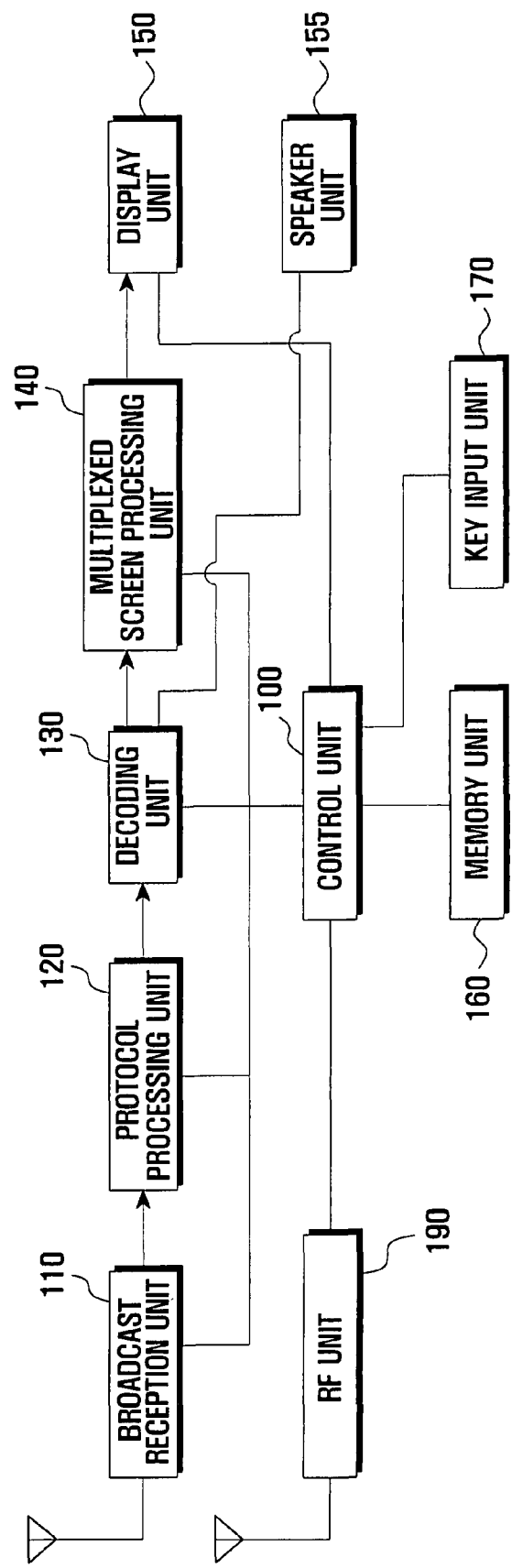

MULTI-SCREEN DISPLAY APPARATUS AND METHOD FOR DIGITAL BROADCAST RECEIVER

CLAIM OF PRIORITY

This application claims priority to an application entitled "MULTI-SCREEN DISPLAY APPARATUS AND METHOD FOR DIGITAL BROADCAST RECEIVER" filed in the Korean Intellectual Property Office on Jul. 10, 2006 and assigned Serial No. 2006-0064635, and on Jul. 10, 2006 and assigned Serial No. 2006-0064636, the entire contents of both which are incorporated herein by reference.

BACKGROUND OF THE INVENTION

1. Field of the Invention

The present invention relates to a digital broadcast receiver and, in particular, to a multiplexed display apparatus and method for a digital broadcast receiver.

2. Description of the Related Art

A digital broadcast receiver is an apparatus that restores original digital data from a broadcast signal transmitted by a broadcast station. The digital data are coded and modulated so as to be broadcast in the form of a broadcast signal by the broadcast station. The digital broadcast receiver demodulates and decodes the broadcast signal for restoring the original digital data. Accordingly, the digital broadcast receiver is provided with a tuner, a demodulator, and a decoder. Recent digital broadcast systems are classified into a digital multimedia broadcast (DMB) system and a digital video broadcasting (DVB) system. These digital broadcast systems provide a plurality of service channels in a frequency bandwidth and each service channel is structured with multiplexed subchannels of video, audio, and program information data.

Current mobile terminals typically realize an enhanced multimedia playback function by using a dedicated multimedia processor, particularly for a digital broadcast playback function. The mobile terminals include mobile phones, laptop computers, Personal Digital Assistants (PDAs), and Portable Multimedia Players (PMPs).

Typically, a digital broadcast system can provide more service channels than an analog broadcast system, such that the subscribers can enjoy various contents in high definition. However, the conventional digital broadcast receiver is provided with a single display so as to display only one program at a time.

SUMMARY OF THE INVENTION

Accordingly, there is a need for a technique capable of displaying multiple programs simultaneously on a single screen of a digital broadcast receiver. The present invention provides a multi-screen display apparatus and method for a digital broadcast receiver that are capable of displaying video data from at least two different service channels simultaneously.

The present invention provides a multi-screen display apparatus and method for a digital broadcast receiver that are capable of displaying predetermined frames of video data of a secondary service channel while displaying video data of a primary service channel.

The present invention provides a multi-screen display apparatus and method for a digital broadcast receiver that are capable of multiplexing video data of a primary service channel and at least one secondary service channel such that the video data of the secondary service channel is displayed on a primary service channel window in the form of resized screen window.

The present invention provides a multi-screen display apparatus and method for a digital broadcast receiver that are capable of multiplexing video data of a primary service channel and at least one secondary service channel such that the video data of the secondary service channel is displayed a predetermined position on a primary service channel window in the form of a resized screen window.

The present invention provides a multi-screen display apparatus and method for a digital broadcast receiver using a time slicing that are capable of receiving video data of a primary service channel and at least one secondary service channel, decoding the video data of the primary service channel and the video data of predetermined frames of the secondary service channel, and displaying the video data in the form of a multi-screen display.

The present invention provides a multi-screen display apparatus and method for a mobile terminal equipped with a digital broadcast receiver that are capable of receiving video data of a primary service channel and at least one secondary service channel, decoding the video data of the primary service channel and the video data of predetermined frames of the secondary service channel, and displaying the video data in the form of a multi-screen display.

In accordance with an exemplary embodiment of the present invention, the above and other objects are accomplished with a multi-screen display apparatus for a digital broadcast receiver. The multi-screen display apparatus includes a broadcast reception unit for receiving broadcast data of a primary and at least one secondary service channels; a decoding unit comprising a video decoder for decoding video data of all types of video frames of the primary service channel and a predetermined type of video frames of the secondary service channel and an audio decoder for decoding audio data of a predetermined service channel, by time frame; a multiplexed screen processing unit for multiplexing the video data of the primary and secondary service channels output by the decoding unit; a display unit for displaying the multiplexed video data in the form of multiplexed screen image; and a speaker unit for outputting the decoded audio data in the form of audible sound wave.

In accordance with another exemplary embodiment of the present invention, the above and other features and functions are accomplished by a multi-screen display apparatus for a DVB-H receiver. The multi-screen display apparatus comprises: a broadcast reception unit for receiving data bursts of a primary service channel and at least one secondary service channel in a time frame; a protocol processing unit for extracting video and audio data from the data bursts; a decoding unit comprising—
  a video decoder for decoding video data of all types of video frames of the primary service channel, and
  a predetermined type of video frames of the secondary service channel and an audio decoder for decoding audio of a predetermined service channel;
a multiplexed screen processing unit for multiplexing video data output by the decoding unit; a display unit for displaying the multiplexed video data output by the multiplexed screen processing unit in the form of a multiplexed screen image; and a speaker unit for output the decoded audio data in the form of audible sound wave.

In accordance with another exemplary embodiment of the present invention, the above and other features and function are accomplished by a multi-screen display method for a digital broadcast receiver. The multi-screen display method includes receiving data bursts of a primary and at least one secondary service channels by predetermined time duration; extracting video and audio data from the data bursts; decoding the video and audio data of the primary and secondary service channels; multiplexing the video data of the primary and secondary service channels; displaying the video data of the primary and secondary service channels in the form of a multiplexed screen image; and outputting the audio data of the primary service channel in synchronization with the video data of the primary service channel.

In accordance with the present invention, the above and other features and functions are accomplished by a multi-screen display apparatus for a DVB-H-enabled mobile terminal equipped with a DVB-H receiver. The multi-screen display apparatus comprises: a digital broadcast receiver including— a broadcast reception unit for receiving data bursts of a primary service channel and at least one secondary service channel in a time frame, a protocol processing unit for extracting video and audio data from the data bursts, a decoding unit comprising (a) a video decoder for decoding video data of all types of video frames of the primary service channel and a predetermined type of video frames of the secondary service channel, and (b) an audio decoder for decoding audio of a predetermined service channel, and a multiplexed screen processing unit for multiplexing video data output by the decoding unit; a radio frequency unit for supporting radio communication;

a control unit for controlling the radio frequency unit to process a call while the multiplexed screen processing unit generating multiplexed screen image in a multi-screen display mode;

a display unit for displaying the multiplexed video data output by the multiplexed screen processing unit in the form of a multiplexed screen image; and a speaker unit for output the decoded audio data in the form of audible sound wave.

In accordance with another exemplary embodiment of the present invention, the above and other features and function are accomplished by a multi-screen display method for a digital broadcast receiver comprising: receiving data bursts of a primary and at least one secondary service channel by predetermined time duration; extracting video and audio data from the received data bursts; determining whether the extracted video data of the at least one secondary service channel is a predetermined type of video frame every time duration; when the video data of the secondary service channel is of the predetermined type of video frame, decoding the video data of the primary and secondary service channels and the audio data of a predetermined service channel; when the video data of the secondary service channel is not of the predetermined type of video data decoding, only the video and audio data of the primary service channel; multiplexing the video data of the primary and secondary service channels; displaying the video data of the primary and secondary service channels in the form of a multiplexed screen image; and outputting the audio data of the primary service channel in synchronization with the video data of the primary service channel.

In accordance with another exemplary embodiment of the present invention, the above and other features and functions are accomplished by a multi-screen display method for a mobile terminal equipped with a digital broadcast receiver, comprising the steps of: receiving data bursts of a primary service channel and at least one secondary service channel by predetermined time duration in a multi-screen display mode; extracting video and audio data from the received data bursts; determining whether the extracted video data of the at least one secondary service channel is a predetermined type of video frame every time duration; when the video data of the at least one secondary service channel is a predetermined type of video frame, decoding the video data of the primary service channel and the at least one secondary service channel and the audio data of a predetermined service channel; when the video data of the at least one secondary service channel is not a predetermined type of video data, decoding only the video and audio data of the primary service channel; multiplexing the video data of the primary service channel and the at least one secondary service channels; displaying the video data of the primary service channel and the at least one secondary service channels in the form of a multiplexed screen image; outputting the audio data of the primary service channel in synchronization with the video data of the primary service channel; when an incoming call is detected in the multi-screen display mode, displaying information on a caller and an incoming call alert; and when an outgoing call request is detected, displaying in the multi-screen display mode, a call request.

In accordance with another exemplary embodiment of the present invention, the above and other features and functions are accomplished by a multi-screen display method for a mobile terminal equipped with a digital broadcast receiver, comprising the steps of: displaying video data of a primary service channel and at least one secondary service channel in the form of a multiplexed screen image by performing the steps of—receiving data bursts of the primary service channel and the at least one secondary service channel by predetermined time duration, extracting video and audio data from the received data bursts, decoding the video data of the primary service and the at least one secondary service channel in a unit of video frame, decoding the video data of a predetermined service channel, multiplexing the video data of the primary service channel and the at least one secondary service channel, displaying the video data of the primary service channel and the at least one secondary service channel in the form of a multiplexed screen image, and outputting the decoded audio data; when an incoming call is detected in the multi-screen display mode, displaying information on a caller and an incoming call alert; and when an outgoing call request is detected in the multi-screen display mode, transmitting a call request.

BRIEF DESCRIPTION OF THE DRAWINGS

The above and other features, functions and advantages of the present invention will be more apparent from the following detailed description taken in conjunction with the accompanying drawings, in which:

FIG. 3 is a block diagram illustrating a configuration of the protocol processing unit 120 and decoding unit of the exemplary embodiment of the present invention illustrated in FIG. 1;

FIG. 5 is a diagram illustrating a physical channel having at least two selected service channels according to an exemplary embodiment of the present invention;

FIG. 12 is a block diagram illustrating mobile terminal equipped with a digital broadcast receiver according to an exemplary embodiment of the present invention.

DETAILED DESCRIPTION OF THE INVENTION

Figure 1:
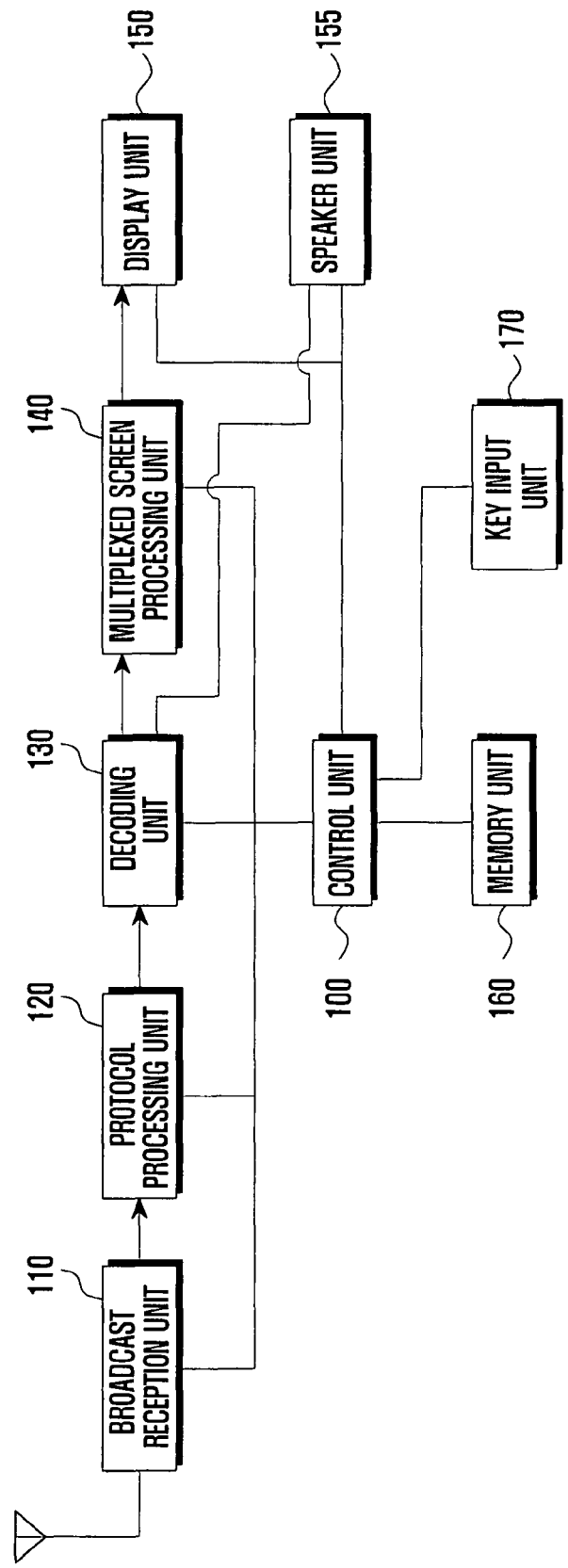
FIG. 1 is a block diagram illustrating a configuration of a digital broadcast receiver according to an exemplary embodiment of the present invention.

Exemplary embodiments of the present invention are described in detail hereinbelow with reference to the accompanying drawings. Note that the same or similar elements in the drawings are designated by the same reference numerals as far as possible although they are illustrated in different drawings, and detailed descriptions of well-known functions and structures incorporated herein may be omitted to avoid obscuring the subject matter of the present invention.

In order to enable a clear and consistent understanding of detailed description and the claims, basic information on the following terms are provided. Unless otherwise noted, terms are to be understood according to conventional usage by those skilled in the relevant art.

In the following embodiments, the multi-screen display apparatus and method are described with a digital broadcast receiver and a mobile terminal equipped with a digital broadcast receiver. Digital broadcast systems typically include Digital Multimedia Broadcasting (DMB), Digital Video Broadcasting (DVB), and Media Forward Link Only (Media FLO) systems. The DVB is classified into a. DVB Terrestrial (DVB-T) and DVB Handheld (DVB-H). The DVB-H delivers broadcast data over Internet Protocol (IP). The multi-screen display apparatus and method of the present invention is described in association with the DVB-H system as an example only. That is, the present invention is not limited to the DVB-H but can be adapted to mobile terminals supporting other DVB, DMB, and Media FLO services.

The following definitions are provided to enable a clear and consistent understanding of the detailed description and the claims.

A "channel" is a frequency channel selected by a tuner, a "service" is a logical channel assigned a program identifier or product identifier (PID) for a broadcast service, an "event" means a program provided through the service channel. In order to avoid complication, the term "physical channel" is used for representing the "channel", and the term "service channel" is used for presenting the "service." The service channels are multiplexed in the physical channel. The physical channel can be represented by the frequency band set by the tuner, and the service channels are represented by the broadcast stations or service providers. The service channel can be identified with PID in the DMB and DVB-T systems. In the case of DVB-H, the service channel is identified with a combination of PID, IP address, and port number. The term "multi-screen" denotes a screen simultaneously presenting video data received from at least two different video sources. The multi-screen can be implemented in a picture-in-picture (PIP) format but is not limited thereto. The term "primary service channel" means a service channel of which video data are displayed in a full screen view. The term "secondary service channel" means a service channel of which video data are displayed in an inset screen view. In a case that the multi-screen mode is enabled, the video data of the primary service channel are displayed at full frame rate, and the video data of the secondary service channel are displayed at a reduced frame rate such that only predetermined frames are presented. In the following embodiments, the predetermined frames are I-frames coded without reference to frames except themselves and/or P-frames that require prior decoding of other frames once. In the following embodiments, the primary service channel is processed to extract both the video and audio data, and the secondary service channel is processed to extract only the video data.

FIG. 1 is a block diagram illustrating a configuration of a digital broadcast receiver according to an exemplary embodiment of the present invention.

Referring to FIG. 1, the mobile terminal includes a broadcast reception unit 110, a protocol processing unit 120, a decoding unit 130, a multiplexed screen processing unit 140, a display unit 150, a speaker unit 155, a memory unit 160, a key input unit 170, and a control unit 100.

The control unit 100 controls general operations of the digital broadcast receiver. The key input unit 170 generates instructions in response to key manipulation and transmits the instructions to the control unit 100. Particularly, the key input unit 170 is configured so as to generate instructions for selecting a primary service channel and at least one secondary service channel and for playing the broadcast. In this embodiment, the primary service and at least one secondary service channel can be selected before and after entering the broadcast playback mode and can be switched during the broadcast playback mode. If the primary service channel and at least one secondary service channel are determined, the control unit 100 processes the broadcast data of the primary service channel and at least one secondary service channel to display on the display screen as they are configured.

The memory unit 160 includes a program memory for storing a first application program for controlling the digital broadcast receiver and a data memory for storing application data produced while the application program is executed. The program memory also stores a second application program for displaying multiplexed video data of the two channels.

The broadcast reception unit 110 receives broadcast streams of at least two service channels selected by the user under the control of the control unit 100. The protocol processing unit 120 performs protocol processing on the received broadcast streams for separately extracting audio, video, and auxiliary data from the at least two service channels. In the case of DVB-H, the protocol processing unit 120 decapsulates IP datagrams, and extracts the audio, video, and program data from the IP datagrams. In the case of DMB and DVB-T, the protocol processing unit 120 analyzes transport stream (TS) and demultiplexes the audio and video data from the TS. The decoding unit 130 is provided with an audio decoder and a video decoder.

The audio decoder performs decoding on the audio data and outputs the decoded audio data, and the video decoder performs decoding on the video data and outputs the decoded video data. The multiplexed screen processing unit 140 multiplexes the video data and output the multiplexed video data to the display unit 150 such that the multiplexed video data are displayed on the display screen.

The decoded video and audio data are played out respectively through the display unit 150 and the speaker unit 155.

In this embodiment, a multi-screen function is enabled with the primary service and the at least one second service channel, the control unit 100 controls the broadcast reception unit 110 to set a physical channel (i.e. frequency) and PIDs of the primary service and the at least one secondary service channel for receiving the broadcast streams of the primary service channel and the at least one secondary service channel. After the physical channel and PIDs are set, the broadcast reception unit 110 receives the broadcast stream of the primary service and the at least one second service channel in the range of the physical channel. The protocol processing unit 120 performs protocol processing on the broadcast streams of the primary service and the at least one secondary service channel and outputs the broadcast streams to the decoding unit 130. The decoding unit 130 decodes the broadcast streams output by the protocol processing unit 120 and outputs the decoded video data to the multiplexed screen processing unit 140 and output the decoded audio data to the speaker unit 155. The multiplexed screen processing unit 140 multiplexes the video data of the primary service and the at least one secondary service channel and outputs the multiplexed video data to the display unit 150 such that the multiplexed video data are displayed in the form of multiplexed screen.

In this embodiment, at least a part of the video data of the at least one secondary service channel, i.e. the video data of predetermined video frames of the secondary service channel, are used to generate the multiplexed screen. For example, if the frame rate of the broadcast stream is 30 frames per second, the video data of the at least one secondary service channel can represent one of the 30 frames, e.g., from every $10^{th}$ or $5^{th}$ frame. Also, the video data of the at least one secondary service channel can represent the even numbered or odd numbered frame. That is, the multiplexed screen is composed of full frame rate video data of the primary service channel and partial frame rate video data of the at least one secondary service channel.

The coded video stream of the service channels are composed of intra frames (I-frames), Bidirectional frames (B-frames), and Predicted frames (P-frames). I-frames, also called key frames, are encoded as a single image, like JPEG compression. P-frames are encoded with dependence to a closest past I-frame. B-frames are encoded relative to the past frame, future frame, or both. The I-frame can be decoded independently of other frames, the P frame can be decoded using the previous I-frame, and the B-frame can be decoded using the past I or P-frame and future I or P-frame. The coded frames have a relationship of I>P>B in data amount and video quality. These I, P, and B-frames are interlaced in an appropriate pattern. For example, P-frames are inserted between I-frames and B-frames are inserted between I and P frames in a pattern of IBBPBBPBBPBBIBBP - - - . In the multi-screen mode, the video data of the I or I and P-frames of the at least one secondary service channel are used for constituting the multiplexed screen.

In this embodiment, it is assumed that a video stream is composed of I, P, and B-frames, and the video data of the at least one secondary service channel is I-frame video data. However, the video data of the at least one secondary service can be frames selected in a predetermined pattern (for example, even numbered frames, odd numbered frames, every $5^{th}$ frames, every $10^{th}$ frames, etc.).

The frame selection can be performed by the protocol processing unit 120 or the decoding unit 130. If the protocol processing unit 120 can distinguish the types of frames and is configured to output the I-frames, the decoding unit 130 decodes only the I-frames output by the protocol processing unit 120. If the protocol processing unit 120 has no capability to distinguish the frame types, the decoding unit 130 can selectively decode the I-frames. The video decoder of the decoding unit 130 performs decoding all the video frame data of the primary service channel and I-frame data of the at least one secondary service channel and outputs the video data to the multiplexed screen processing unit 140. The multiplexed screen processing unit 140 generates a multiplexed screen using the video data of the primary service channel and secondary video data output by the decoding unit 130 and outputs the multiplexed screen to the display unit 150.

The digital broadcast receiver can be configured in accordance with the broadcast system. In the case of DMB and DVB-T system, the broadcast stream is received in the MPEG2-TS, each MPEG2-TS packet comprises a packet header and a payload. The packet header contains PID for identifying the service channel. Accordingly, the digital broadcast receiver can detect a target service channel with reference to the PID.

The payload of the MPEG2-TS packet for the DMB and DVB-T contains broadcast data, and the payload of the MPEG2-TS for the DVB-H contains IP datagram.

In the case of DVB-T and DMB, the broadcast data demodulator demodulates the MPEG2-TS packet, the protocol processing unit 120 demodulates the audio and video data and broadcast information of the service channel, and the decoder 130 decodes the audio, video and program data output by the protocol processing unit 120.

In the case of DVB-H, the broadcast data demodulator is provided with a demodulator for demodulating the MPEG2-TS packet, a PID filter for filtering service channels selected by the user, and at least one demodulation controller for controlling operations of the demodulator and tuner under the control unit 100. In this case, the protocol processing unit 120 decapsulates IP datagrams and outputs audio and video data and broadcast information, and the decoding unit 130 can be provided with the audio and video data and broadcast information decoders.

Although the decoding unit 130 can be implemented with the audio data decoder, video data decoder, and broadcast information decoder, the broadcast information decoder is assumed to be integrated into the control unit 100 in this embodiment. In this case the broadcast information decoder is implemented in software. The broadcast information includes program information, program-related image, and interactive information allowing users to participate in the program. For example, the broadcast information of the DMB includes an Electronic Program Guide (EPG), and the broadcast information of the DVB-H includes an Electronic Service Guide (ESG).

In the following description, the digital broadcast receiver is a DVB-H receiver.

Figure 2:
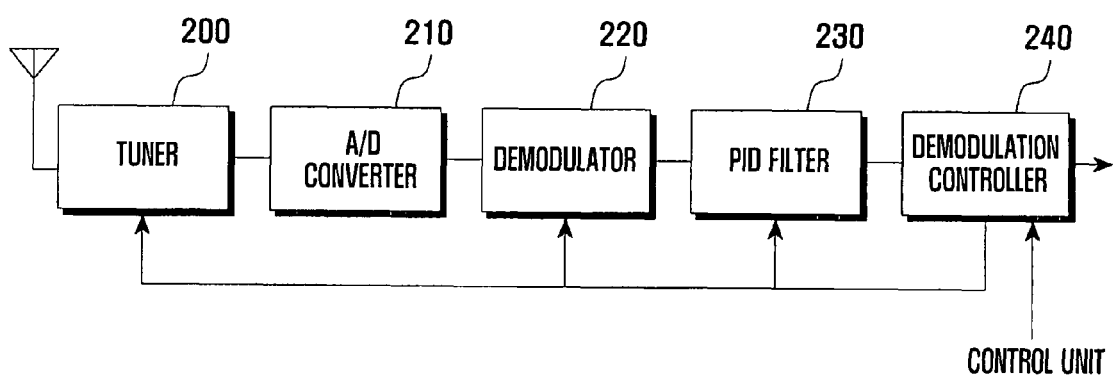
FIG. 2 is a block diagram illustrating a configuration of the broadcast reception unit of the exemplary embodiment of the present invention illustrated in FIG. 1.
Figure 4A:
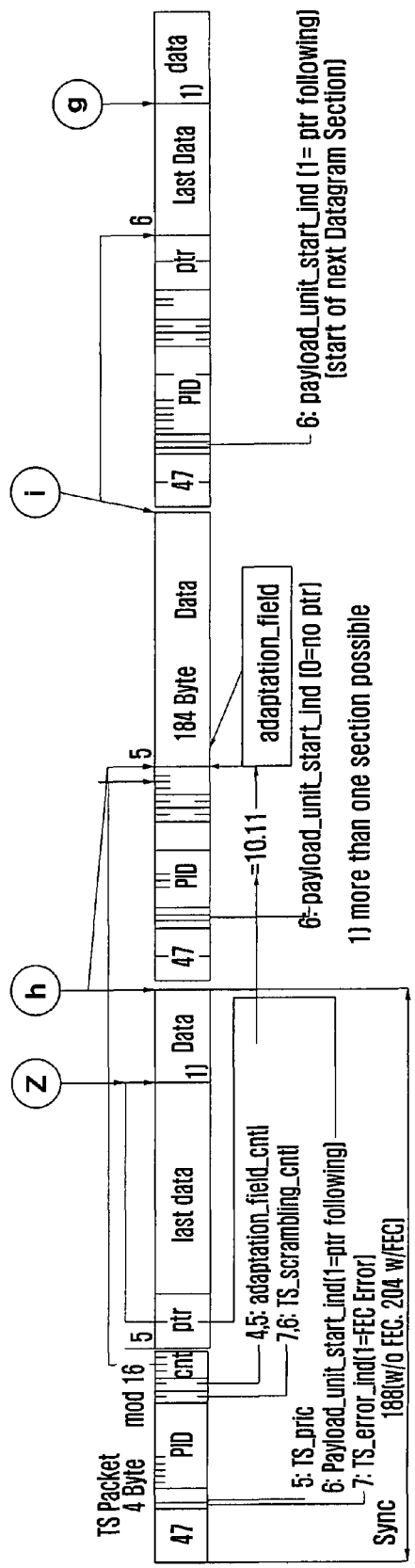
FIGS. 4A-4F represent a diagram illustrating a data frame format of a transport stream for a DVB-H system according to an exemplary embodiment of the present invention.
Figure 4B:
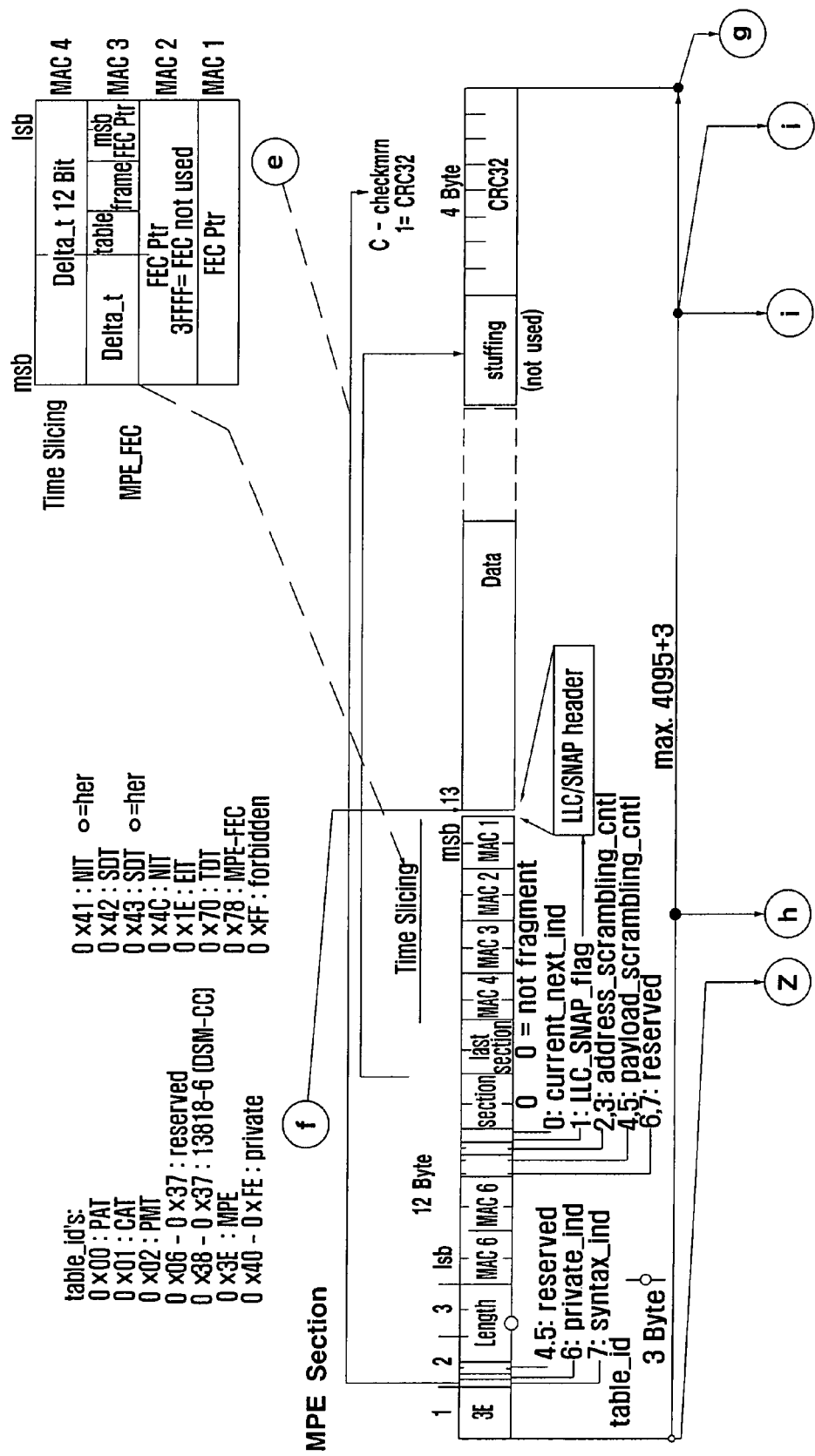
Figure 4C:
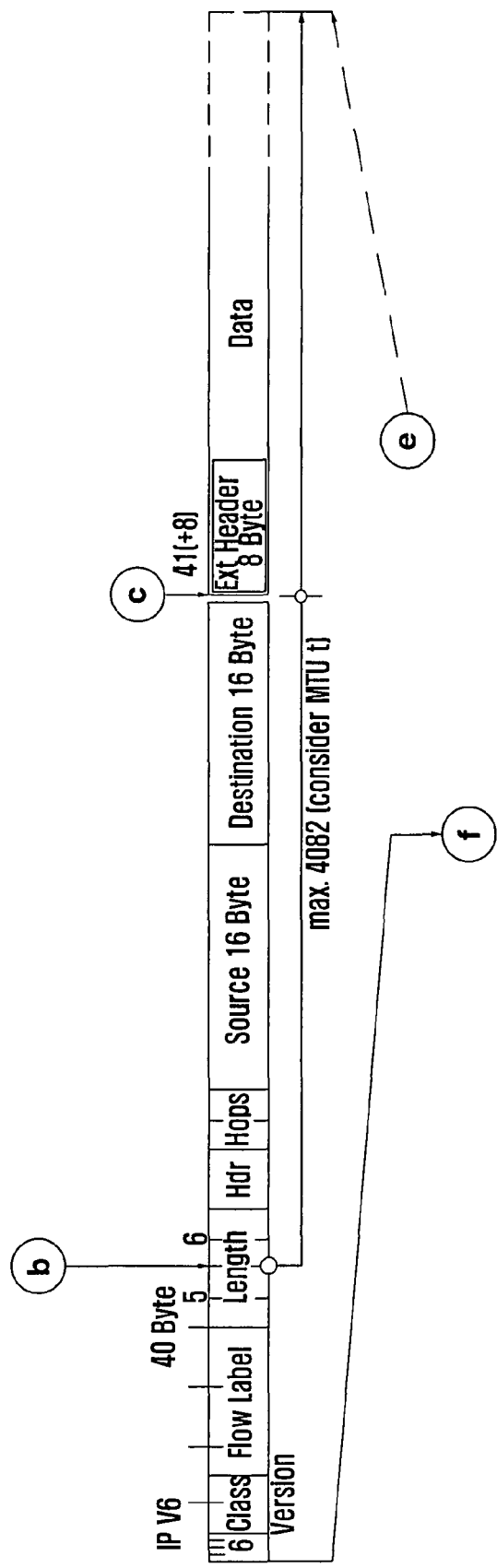
Figure 4D:
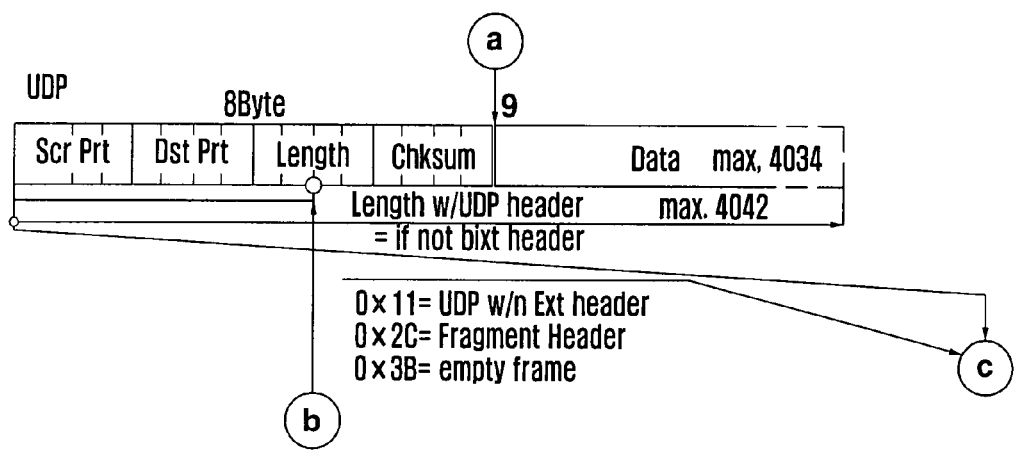
Figure 4E:
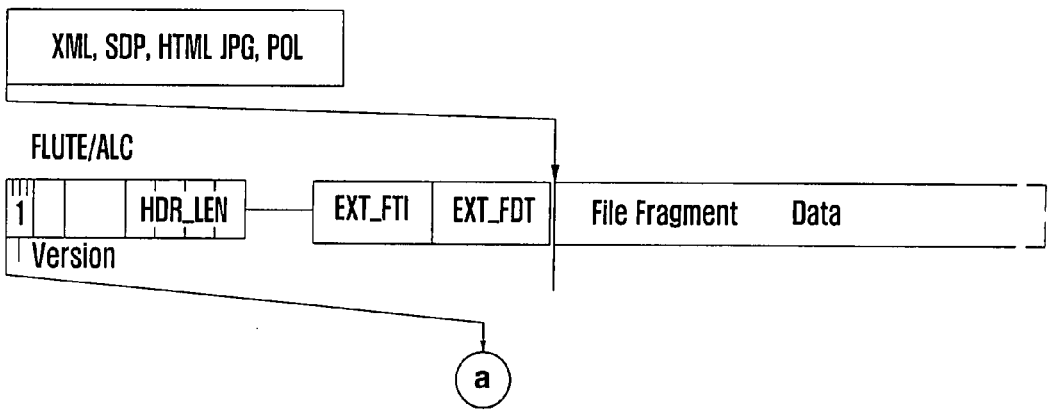
Figure 4F:
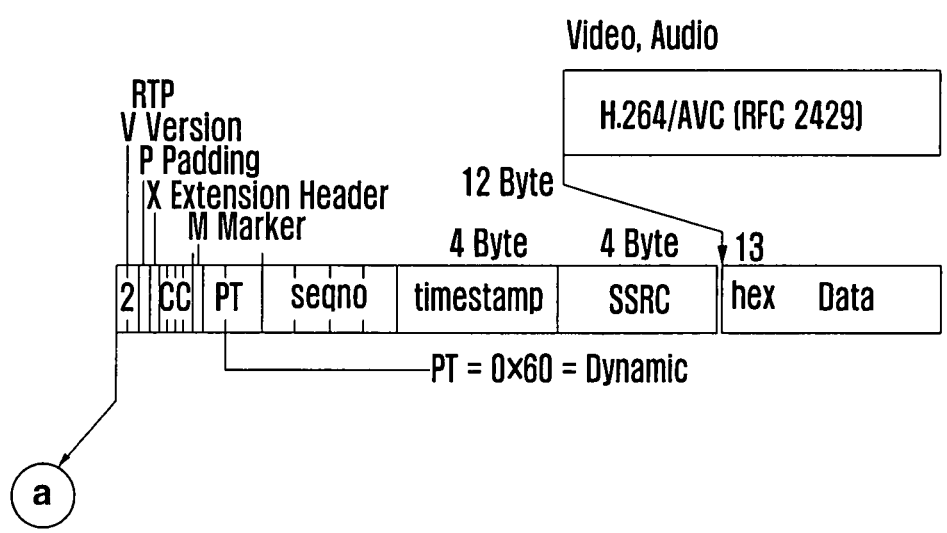

FIG. 2 is a block diagram illustrating a configuration of the broadcast reception unit 110 of FIG. 1, FIG. 3 is a block diagram illustrating a configuration of the protocol processing unit 120 and decoding unit 130 of FIG. 1, FIGS. 4A-4F represent a diagram illustrating a data frame format of a transport stream for a DVB-H system according to an exemplary embodiment of the present invention, and FIG. 5 is a diagram illustrating a physical channel having at least two selected service channels according to an exemplary embodiment of the present invention.

Referring to FIGS. 4A-4F, the broadcast data of the DVB-H system are structured in the form of Motion Picture Experts Group 2 transport stream (MPEG2-TS), and the MPEG2-TS format is implemented as a packet stream, each packet contains 4 bytes of packet header and 184 bytes of payload. The packet header contains packet synchronization and packet identification (PID) information. The PID can be used as a service identifier for identifying service channel and program data contained in the payload. The payload consists of multi protocol encapsulation (MPE) sections. Each MPE section includes a table identifier (table_ID), MPE forward error correction (MPE-FEC) information for correcting errors of the received data, information for slicing the received data in time. Each MPE contains at least one IP datagram. In FIGS. 4A-4F, IPv6 datagram is depicted as an example. The IP datagram includes an IP version information, source IP address and destination IP address. The IP datagram consists of user datagram protocol (UDP) units and each UDP unit includes port addresses of the transmitter and receiver. Using the destination IP address the broadcast service can be provided to a specific IP user in an IP datacast rather than the broadcast. The UDP unit contains FLUTE/ALC units and a real time transport protocol (RTP) unit. The FLUTE/ALC unit includes the ESG and files, and the RTP unit includes audio and video data.

Referring to FIG. 5, a frame consists of a plurality of service channels that are multiplexed in a time slicing scheme (see 5a of FIG. 5). The frame has a duration (Δt) and is sliced into 10 timeslots CH1 to CH10. Each time slot is assigned for a service channel. In this embodiment, it is assumed that services CH3 and CH8 are the primary service channel and the at least one secondary service channel, respectively. Accordingly, the service channels CH3 and CH8 are called burst-on times, and the remaining service channels are called burst-off times. The broadcast reception unit 110 is switched on at the burst-on times and switched off at the burst-off times for receiving primary service channel bursts MB1 to MB4 and the at least one secondary channel bursts SB1 to SB4 (see 5b of FIG. 5). The burst data of the primary service channel and the at least one secondary service channel are decoded per frame (Δt) (see 5c of FIG. 5). Reference numeral 5c illustrates an immediate decoding scheme in which the data bursts are immediately decoded upon being received, and the reference numeral 5d illustrates a buffered decoding scheme in which the data bursts are buffered and then decoded during the next frame time (Δt). In this manner, the burst data of the primary service and the at least one secondary service channel are decoded per frame and displayed in the form of multiplexed screen.

Referring to FIG. 2, the broadcast reception unit 110 includes a tuner 200 and a broadcast data demodulator. The broadcast data demodulator includes an analog/digital (A/D) converter 210, a demodulator 220, a PID filter 230, and a demodulation controller 240. The tuner 200 is tuned to the physical channel of the DVB-H so as to receive the service channels constituting the physical channel. The tuner 200 includes a phase-locked loop (PLL) circuit for generating a frequency for the physical channel, a mixer for mixing the received signal and the signal generated by the PLL, and a band-pass filter for passing the frequency of the physical channel.

The demodulation controller 140 controls the tuner 200 to be tuned the physical channel and controls the PID filter 230 to be set with PIDs of the primary and secondary service channels, under the control of the control unit 100. At this time, the control unit 100 analyzes a Program Specific Information/Service information (PSI/SI) output from the broadcast reception unit 110 and Service Description Table (SDT) information included in an Electronic Service Guide (EPG) so as to extract the PIDs, IP addresses, and port numbers associated with the selected service channels. If the PID filtered by the PID filter 230 is a Network Information Table (NIT) PID, Service Description Table (SDT) PID, or Event Information Table (EIT) PID, the control unit 100 can check the physical channel and PIDs of the service channels from the PSI/SI carried in the tables.

The protocol processing unit 120 extracts SDP from the ESG (see reference numeral 4e of FIG. 4) and the control unit 100 can check the PIDs, IP addresses, and port numbers for identifying the service channels and video and audio data. The control unit 100 determines the PIDs, IP addresses, and port numbers of the service channels and audio and video data of each service channel on the basis of the information of the SDT. After the service channels are determined, the control unit 100 outputs control signals to the demodulation controller 240 for filtering the physical channel and PIDs of the service channels. If at least 2 service channels are set for the multi-screen mode, the control unit 100 outputs channel control signal containing the PIDs of the service channels to the demodulation controller 240. The service channels include a primary service channel and at least one secondary service channel. In this embodiment, it is assumed that the video data of the primary service channel and the secondary service channel are used for forming the multiplexed screen.

In the following description, the multi-screen display method is described with an example of multiplexing the video data of a signal of a primary service channel and a signal of at least one secondary service channel for generating the multiplexed screen.

The demodulation controller 240 sets the tuner 200 with the frequency of the DVB-H and sets the PID filter 230 with the PIDs of the primary service channel and the at least one secondary service channel. The tuner 200 is tuned to the DVB-H frequency to receive the broadcast signals, the A/D converter 210 converts the broadcast signals into digital broadcast streams, and the demodulator 220 demodulates the broadcast streams to recover the original broadcast data. The demodulator 220 can be implemented with an Orthogonal Frequency Division Multiplexing (OFDM) demodulator or a Coded OFDM (COFDM) demodulator 220. The broadcast streams output by the demodulator 220 can be the MPEG2-TS (see 4a of FIG. 4) and each TS packet, in this case, includes a PID for identifying the service channel carried by the TS packet. The PID filter 230 filters the broadcast data having the PIDs of the primary service channel and the at least one secondary service channel from the IP datagram (see 4c of FIG. 4) and transmits the PSI/SI information to the control unit 100. The broadcast data passed through the PID filter 230 can include the MultiProtocol Encapsulation-Forward Error Correction (MPE-FEC) sections and time slicing information. In this case, the demodulation controller 240 performs time slicing control on the burst data. That is, the demodulation controller 240 controls the tuner 110 and demodulator 220 to be switched on using the time slicing information. The time slicing information includes the burst-on time information of the primary service channel and the at least one secondary service channel such that the demodulation controller 240 controls the tuner 200 and the demodulator 220 to be switched on at the burst-on times and switched off at the burst-off times. Also, the demodulation controller 240 performs the MPE-FEC functions on the broadcast data of the primary service channel and the at least one secondary service channel output by the PID filter 230 using the MPE section information (see 4b of FIG. 4).

As described above, the demodulation controller 240 controls the tuner 200 to be tuned to the DVB-H frequency and the PID filter 230 to be set with the PIDs of the primary service channel and the at least one secondary service channel. Also, the demodulation controller 240 performs the time slicing to reduce power consumption of the digital broadcast receiver on the basis of the information of the MPE section and performs the MPE-FEC function for correcting reception errors. The data output by the demodulation controller 240 is the IP datagram (4c of FIG. 4).

In the above-structured digital broadcast receiver 100, the tuner 200 is tuned to the DVB-H frequency, the A/D converter 210 converts the broadcast signal received through DVB-H frequency into the broadcast signal into digital broadcast streams, and the demodulator 220 demodulates the digital broadcast streams in the OFDM or COFDM scheme. The demodulated broadcast stream has the MPEG2-TS packet stream format (see 4a of FIG. 4) of which each TS packet having a PID for identifying the service channel. The PID filter 230 checks the PIDs of TS packets and passes only the packet having the PIDs of PSI/SI and the primary service channel and the at least one secondary service channel. The data carried by the packet having the PIDs associated with the PSI/SI are forwarded to the control unit 100, and the broadcast data of the primary and secondary service channels and the broadcast information data including ESG are output to the demodulation controller 240. The demodulation controller 240 analyzes the MPE sections (see 4b of FIG. 4) and performs time slicing control and error corrections on the data of the PID filtered service channels.

FIG. 3 is a block diagram illustrating a configuration of the protocol processing unit of a DVB-H mobile terminal according to an exemplary embodiment of the present invention.

Referring to FIG. 3, the protocol processing unit 120 checks the IP and other protocol information of the selected service channel data and extracts the video and audio data from the service channel data. The video decoder unit includes a video decoder 500 and an audio decoder 590 such that the video decoder 500 decodes the video data output from the protocol processing unit 120 and outputs the video data through the display unit 140 as a viewable image, and the audio decoder 590 decodes the audio data output from the protocol processing unit 120 and output the audio data to the audio processing unit 150. The audio processing unit 150 outputs the audio data output from the audio processing unit 150 through the speaker unit 155 in the form of audible sound wave.

The protocol processing unit 120 includes an IP decapsulator 310, a UDP decapsulator 320, a FLUTE deliverer 330, and an RTP deliverer 340.

The IP decapsulator 310 extracts an IP datagram 4c of FIG. 4 from the MPE section 4b of FIG. 4 and decapsulates the IP datagram to check the source and destination IP addresses. The UDP decapsulator 320 extracts a UDP unit 4e of FIG. 4 from the IP datagram and decapsulates the UDP unit to check the source and destination port numbers. If the data carried by the UDP unit is FLUTE/ALC protocol data, the UDP decapsulator 320 transport the FLUTE/ALC protocol data to the FLUTE deliverer 330. If the data carried by the UDP unit is RTP data, the UDP decapsulator 320 transport the RTP data to the RTP deliverer 340. The FLUTE/ALC protocol data may include ESG or other type of data such as XML, SDP, HTML, JPG, and POL. The RTP data may include the audio and video data. The RTP deliverer 340 performs demultiplexing the RTP data so as to output the video data to the video decoder 500 and the audio data to the audio decoder 590.

The protocol processing unit 120 operates under the control of the control unit 100. The control unit 100 can integrate an ESG engine (XML engine and ESG decoder), an SDP parser, and a PSI/SI decoder. The control unit 100 also can integrate a protocol information controller and manager for controlling the protocol process and management. The control unit 100 processes the protocol information and data received from the protocol processing unit 120. That is, the control unit 100 analyzes the PSI/SI table (NIT, SDT, and EIT) extracted by the broadcast reception unit 110 so as to check the PSI/SI according to the MPEG-2 and DVB-SI standards, parses the ESG data received from the protocol processing unit 120, and then controls the overall operation of the broadcast reception unit 110 on the basis of these information.

The service channels, ESG per service channel, and audio and video data are identified using the PID, IP, port information. That is, the PSI/SI and SDP is provided with tables defining information on the service channel identifiers, audio and video identifiers, and ESG identifiers. The control unit 100 can identify the service channels, audio data, video data, and ESG data with reference to the decoding result of the PSI/SI and the SDT. The control unit 100 may integrate the protocol processing unit 120.

The control unit 100 also controls the operation of the protocol processing unit 120. Typically, the MPEG-TS stream carries audio and video data. That is, the burst data comprises the video and audio data. Accordingly, the control unit 100 analyzes the types of data received through the service channel and controls the internal elements to cooperate with each other according to analysis result. That is, if an MPE section is received, the control unit 100 controls the demodulation controller 240 to receive the burst information such that the demodulation controller 240 analyzes the MPE section data and performs time slicing and MPE-FEC functions according to the analysis result. If an IPv6 datagram is contained in the MPE section, the control unit 100 controls the IP decapsulator 310 to extract the IP information. If a UDP unit is detected from the IPv6 datagram, the control unit 100 controls the UDP decapsulator 320 to extract the port numbers. If a FLUTE/ALC unit is contained in the UDP unit, the control unit 100 controls the FLUTE deliverer 330 for processing the ESG and equivalent files formats. If the RTP unit is contained in the UDP unit, the control unit 100 controls the RTP deliverer 340 for processing the RTP unit. The video and audio data output from the RTP deliverer 340 are delivered to the video decoder 500 and the audio decoder 590, respectively. The control unit 100 analyzes the data and activates internal processing blocks required for processing the data. Other internal elements that are not involved in the data processing, bypass the data.

The internal processing blocks of the demodulation controller 240 of FIG. 2 and the protocol processing unit 120 of FIG. 3 are connected in series in this embodiment, however, the internal processing blocks of the demodulation controller 240 and the protocol processing unit 120 can be connected in parallel such that only the processing blocks required for processing the corresponding data type are activated. The internal processing blocks can be implemented as software modules. In this case, the control unit 180 enables the required modules for processing a task.

The video and audio data are output from the protocol processing unit 120 after being demultiplexed such that the video decoder 500 can decode the video data and output the decoded video data through the display unit 140 as a visual image, and the audio decoder 590 can decode the audio data and output to the audio processing unit 150. In the case that the multi-screen display mode is enabled, the video decoder 500 decodes the video data of the primary and secondary service channels in different manners. That is, the video decoder 500 decodes the video data of all the frames of the primary service channel in accordance with the demodulation control signal (VDTS or VPTS), and decodes the video data of the predetermined frames (in this embodiment, I-frames) of the secondary service channel. The audio data is processed by the audio processing unit 150 and then output through the speaker as an audible sound wave. The video decoder can be a H.264 standard decoder or a MPEG series decoder, and the audio decoder can be an advanced audio coding (AAC) decoder.

In the case that the multi-screen display mode is enabled, the above-structured digital broadcast receiver receives the broadcast data of the primary and secondary service channels at their burst-on times of every frame ($\Delta t$) and processes the video data of the primary service channel and the at least one secondary service channel to be multiplexed in the form of a multiplexed screen. While displaying the multiplexed screen on the display unit 150, one of the audio data of the primary service channel and the at least one secondary service channel can be played. In this embodiment, the audio data of the primary service channel is played.

As described above, the above-structured digital broadcast receiver can display at least two video screens for a primary service channel and at least one secondary service channel on the display unit 150. If a channel switching is requested (especially, channel switching between the primary service channel and the at least one secondary service channel) while the broadcast data of the primary and secondary service channels are displayed in the multiplexed screen format, the channel switching can be immediately performed. If a channel switching occurs between the primary service channel and the at least one secondary service channel, the video decoder 500 of the decoding unit 130 decodes the video data of the all frames of the new primary service channel and video data of the predetermined frames of the new secondary service channel.

If the at least one secondary service channel is switched to the primary service channel and a new secondary service channel is selected, the digital broadcast receiver plays the video data of the new primary service channel and retains playing of the at least one secondary service channel until receiving the next data burst of the new secondary service channel.

FIG. 5 is a diagram illustrating a physical channel having at least two selected service channels according to an exemplary embodiment of the present invention.

A DVB-H system uses the time slicing scheme for reducing the power consumption by switching power on at the burst-on times of the selected service channels and switching power off at the burst-off times. As illustrates in FIG. 5, each frame consists of 10 service channels CH1 to CH10 that are multiplexed in a time slicing scheme, and the service channels CH3 and CH8 are selected as the primary service channel and the at least one secondary service channel, respectively.

Accordingly, the service channels CH3 and CH8 become the burst-on times, and the remaining service channels CH1, CH2, CH4 to CH7, CH9, and CH10 become the burst-off times. The multiplexed service channels are transmitted in temporal order from CH1 to CH 10. In each time duration ($\Delta t$), one data burst occurs per service channel. The time duration is also called a burst reception interval.

The broadcast reception unit 110 is switched on at the burst-on times and switched off at the burst-off times for receiving primary service channel bursts MB1 to MB4 and the at least one secondary channel bursts SB1 to SB4 (see 5*b* of FIG. 5). The burst data of the primary service channel and the at least one secondary service channel are decoded per frame ($\Delta t$) (see 5*c* of FIG. 5).

The audio, video, and broadcast information data are separated by the protocol processing unit 120 and then delivered to the corresponding decoders. The ESG data is processed by the FLUTE deliverer 330 of the protocol processing unit 120 and then transmitted to the control unit 180. The control unit 180 compresses the ESG data and stores the compressed ESG data into the memory unit 160.

In the case that the CH3 and CH8 are selected as the primary service channel and the at least one secondary service channels, the demodulation controller 240 switches on the tuner 200 and the demodulator 220 at the burst-on times for the CH3 and CH8 (see 5*b* of FIG. 5). Accordingly, the tuner 200 receives the data burst of the service channels CH3 and CH8, and the demodulator 220 demodulates the data burst output by the tuner 200 and outputs the data burst in the form of the TS stream (see 4*a* of FIG. 4). The PID filter 230 filters the broadcast data of the service channels CH3 and CH8 referring to the PIDs contained in the packet header of each TS packet, and the demodulation controller 240 performs error corrections on the broadcast data output by the PID filter 230. The protocol processing unit 120 performs protocol processing on the broadcast data output by the broadcast reception unit 110 so as to output the audio and video data from the broadcast data to the audio and video decoder 590 and 500 of the decoding unit 130. The audio decoder 590 decodes the audio data of the primary service channel CH3 and outputs the decoded audio through the speaker unit 155 in the form of an audible sound wave. The video decoder 500 decodes the video data of the primary service and the at least one secondary service channel CH3 and CH8.

The video decoder 500 performs decoding the video data during a time interval ($\Delta t$) between a time at which the data burst of the CH3 is completely received and a time at which the next data burst of the CH3 starts (see 5*c* of FIG. 5). The video data decoding also can be performed during the next time interval ($\Delta t$) (see 5*d* of FIG. 5).

Figure 6:
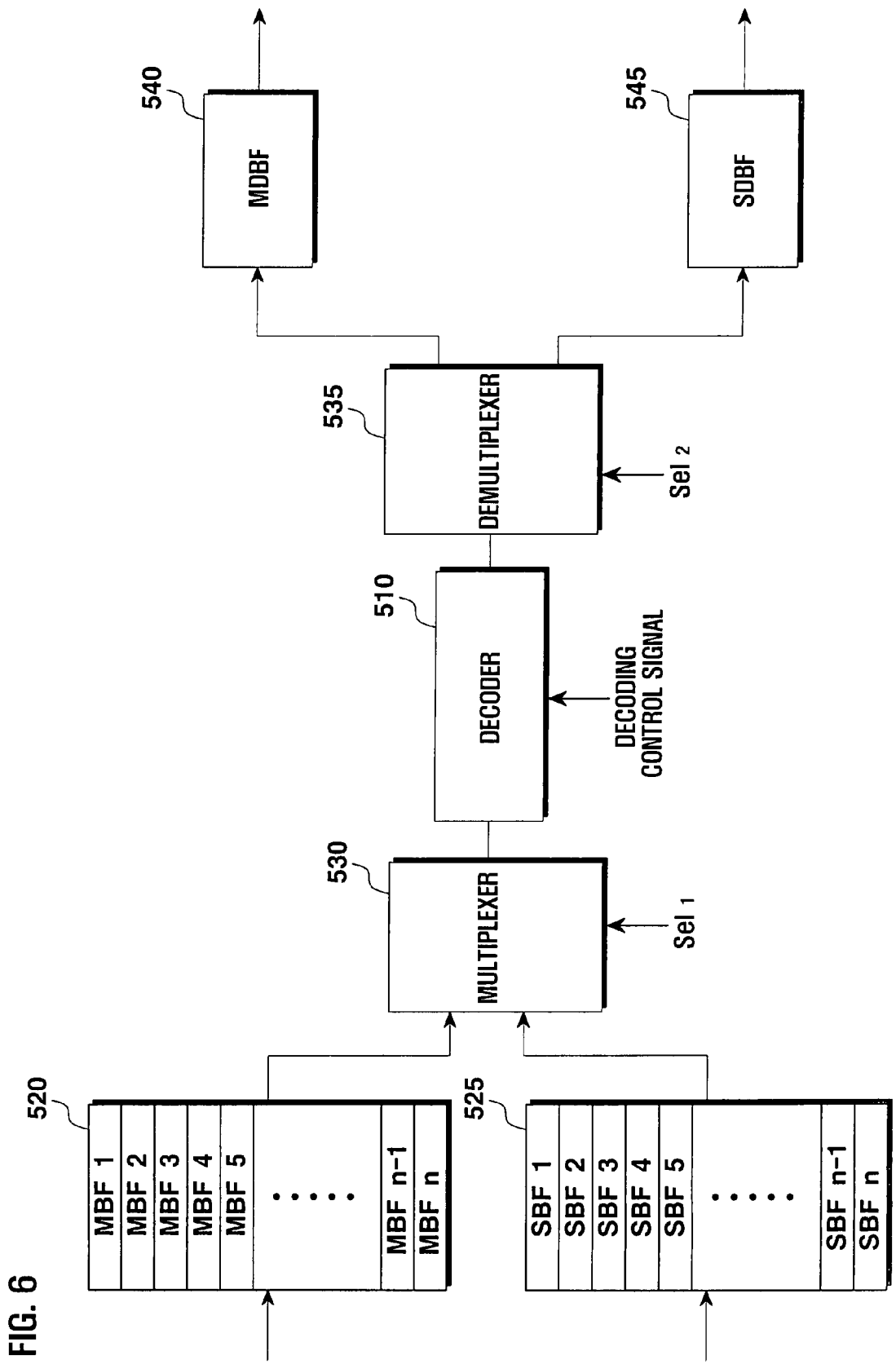
FIG. 6 is a block diagram illustrating a configuration of the video decoder of the exemplary embodiment of the present invention illustrated in FIG. 3.
Figure 7:
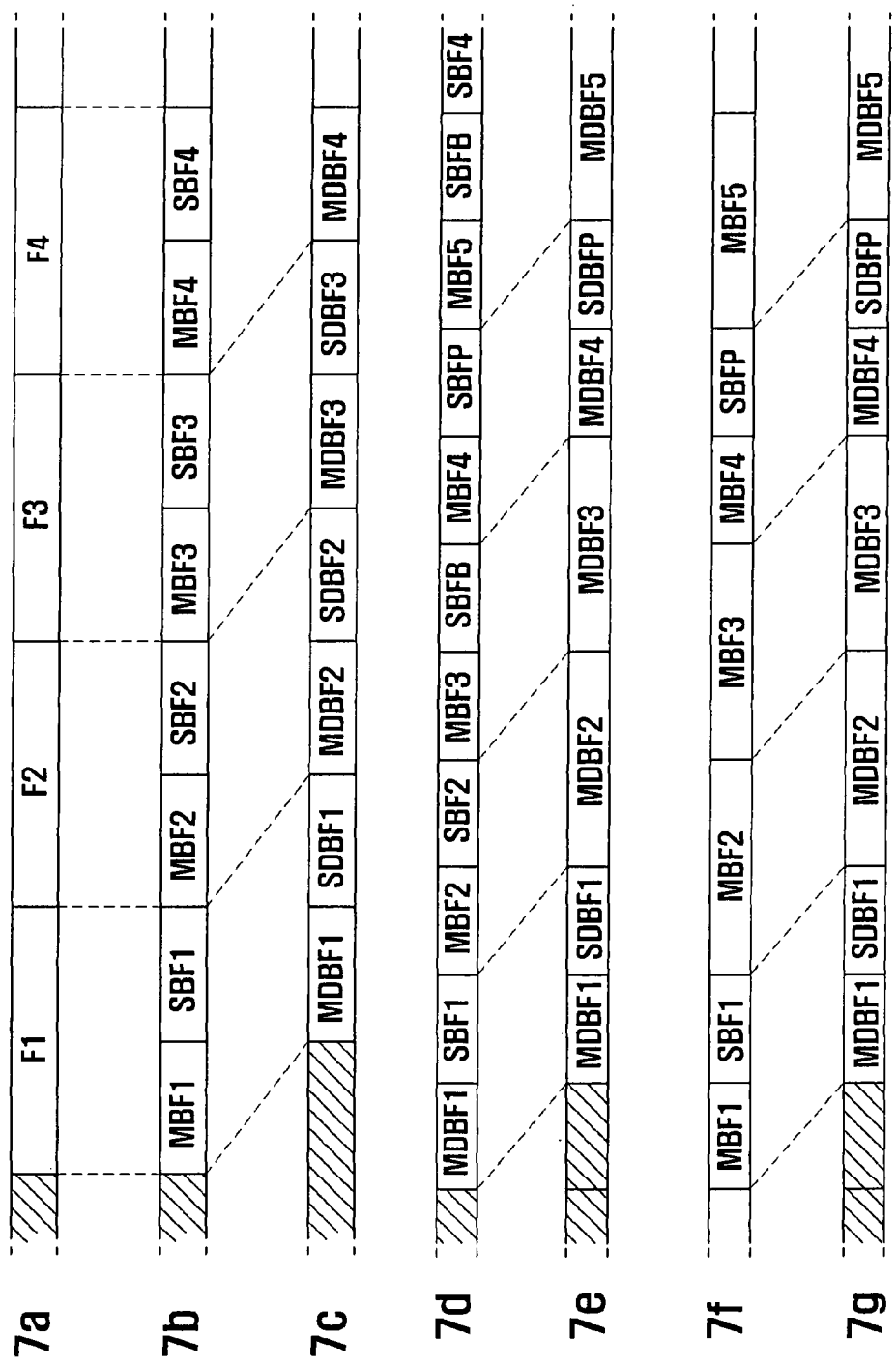
FIG. 7 is a timing diagram illustrating a decoding operation of the video decoder 500 of the exemplary embodiment of the present invention illustrated in FIG. 3.

FIG. 6 is a block diagram illustrating a configuration of the video decoder of FIG. 3, and FIG. 7 is a timing diagram illustrating a decoding operation of the video decoder 500 of FIG. 3. In this embodiment, it is assumed that the video data of the secondary service channel are of I-frames or I and P-frames.

Referring to FIG. 7, the video decoder 500 decodes the video frame data of the primary service channel and the at least one secondary service channel every frame (see reference numeral 7*a* of FIG. 7). In the case that the I-frames of the at least one secondary service channel are used, the video decoder 500 decodes the video frame data of the primary service channel of all the time frames and decodes the video frame data of the at least one secondary service channel of the time frames carrying the I-frames (see 7*b* and 7*c* of FIG. 7).

In the case that the I and P-frames of the at least one secondary service channel are used, the video decoder 500 decodes the video frame data of the primary service channel of all the time frames and decodes the video frame data of the at least one secondary service channel of the time frames carrying the I and P-frames (see 7*d* and 7*e* of FIG. 7).

Also, the I, P, and B-frames can be distinguished by the protocol processing unit 120. In this case, the protocol processing unit 120 can selectively output the predetermined video frame data of the at least one secondary service channel together with all the video frame data of the primary service channel such that the video decoder 500 decodes the video frame data of the primary service channel and the at least one secondary service channel without checking the frame type of the at least one secondary service channel (see 7*f* and 7*g* of FIG. 7).

The video data of the primary service channel and the at least one secondary service channel output by the protocol processing unit 130 are buffered in respective primary and at least one secondary input buffers 520 and 525, respectively. Preferably, the video data are buffered in units of a frame. In FIG. 7, the primary input buffer 520 buffers coded video frame MBF1 to MBFn of the primary service channel, and the at least one secondary input buffer 525 buffers coded video frames of the at least one secondary service channel. MDBF denotes decoded video frame of the primary service channel, and SDMF denotes decoded video frame of the at least one secondary service channel. Since the MBF and SBF are coded data, their size is smaller than that of the MDBF and SDBF. Accordingly, the coded video data buffered in the primary buffer and the at least one secondary input buffers 520 and 525, respectively, are smaller than the decoded video data buffered in the MDBF 540 and SDBF 545 in size. The coded video data can be I, P, or B frame video data.

The video data decoding operations are controlled in accordance with video decoding control signals. The video decoding control signals include a Decoding Time Stamp (DTS) and a Presentation Time Stamp (PTS). The DTS is a decoding start signal for controlling the start time of video frame data decoding, and the PTS is a presentation control signal for controlling the start time of transporting the video data buffered in the output buffers to the display unit 150. In the case using DTS, the video decoder 500 starts decoding the coded video frame data buffered in input buffers 520 and 525 and outputs the decoded video frame data from the MDBF 540 and SDBF 545 to the display unit 150 according to the DTS information. The size of the primary input buffer 520 is determined such that a plurality of coded video frame data can be stored therein (to buffer a maximum data burst). Also, the size of the at least one secondary input buffer 525 can be determined in accordance with the output result of the protocol processing unit 120. That is, when the protocol processing unit 120 has no frame recognition capability so as to output the I, P, and B frames of the at least one secondary service channel, the at least one secondary input buffer 525 has a buffer size identical with that of the primary input buffer 520. However, when the protocol processing unit 120 checks the types of the I, P, and B frames and selectively outputs specific type of frames, the size of the at least one secondary input buffer 525 is determined in consideration of the video data output by the protocol processing unit 120.

The MDBF 540 and SDBF 545 can be implemented with small buffer sizes enough for storing the small video data (minimum frame size). That is, the decoder 510 outputs the decoded video data in a video frame size. The decoder performs decoding of one of the video data of the primary service channel and the at least one secondary service channel and the video data of only the primary service channel. In this case, the MDBF 540 buffers the decoded video data per frame, and the at least one secondary output buffer 545 buffers the decoded video data of the at least one secondary service channel when video data of the I-frame or I and P-frames are decoded. The display unit 150 displays the decoded video data buffered in the MDBF 540 and SDBF 545. in the case of using the DTS, the decoded video frame data stored in the MDBF 540 and SDBF 545 are immediately read out to be displayed. Accordingly, the MDBF 540 and SDBF 545 are configured to have sizes larger than the video data of one frame.

When using the PTS, the video decoder 510 decodes the coded video frame data stored in the input buffers 510 and 515 and outputs the decoded video frame data to the MDBF 540 and SDBF 545. The decoded video frame data buffered within the MDBF 540 and SDBF 545 are output to the display unit 150 in accordance with the PTS information. In this case, the sizes of the input buffers 520 and 525 can be set for storing small video frame data in accordance with the PTS information. That is, when the PTS is used, the MDBF 540 and SDBF 545 store the decoded video frame data and output the decoded video frame data to the display unit 150 in accordance with the PTS such that the sizes of the output buffers are set to a relatively large buffer size.

In this embodiment, it is assumed that the DTS information is used and the MDBF 540 and SDBF 545 have buffer sizes appropriate for storing the decoded video frame data. Also, it is assumed that the protocol processing unit 120 outputs all the video frame data of the primary service channel and the at least one secondary service channel to the video decoder 500.

A multiplexer 530 generates a selection (Sel1) for DTS synchronization and thus the video frame data of the primary service channel and at least one secondary service channel are selected in frame cycle. The Sel1 is 1 byte for 2 multiplexed screens, 2 bytes for 3 or 4 multiplexed screens, and 3 bytes for 5 to 8 multiplexed screens. The Sel1 can be generated in different formats according to whether the protocol processing unit 120 is able to distinguish the frame type for selectively outputting the I, P, and B frames. That is, when the protocol processing unit 120 has no capability for distinguishing frame type the video data of the types of I, P, and B frames cannot be output and the multiplexer 530 multiplexes the video data of all the type of frames and outputs the multiplexed video data to the decoder 510. However, if the protocol processing unit 120 has the capability for distinguishing frame type, the multiplexer 530 multiplexes the video data of all the frames for the primary service channel and the video data of specific frames selectively output by the protocol processing unit 120 and outputs the multiplexed video data to the decoder 510. In the former case, the Sel1 is generated for controlling the video data of the primary service channel and the at least one secondary service channel (see reference numerals 7*b* and 7*d* of FIG. 7).

In the latter case, the Sel1 is generated for selecting and multiplexing the video data of the primary service channel and the predetermined frames (in this embodiment, I-frames or I and P-frames) of the at least one secondary service channel for the time frame (Δt) that includes the predetermined frames. When the time frame (Δt) carries no predetermined frames, the Sel1 is generated for selecting and multiplexing the video data of the primary service channel (see reference numeral 7*g* of FIG. 7). FIG. 7 illustrates an example of multiplexing the video data of one primary service channel and one secondary service channel. In this case, the Sel1 is 1-byte long.

A video data decoding operation is described hereinafter with reference to FIG. 7 in more detail.

Upon receiving the Sel1, the multiplexer 530 selects the video data of the primary service channel buffered within the primary input buffer 520 at the first half of each frame (Δt) and delivers the video data to the decoder 510, and selects the video data of the at least one secondary service channel buffered within the at least one secondary buffer 525 at the last half of the frame (Δt) and delivers the video data to the decoder 510.

At this time, the demultiplexer 535 receives a selection signal Sel2, corresponding to the Sel1, for controlling such that the demultiplexer 535 selects the video data of the at least one secondary service channel output by the decoder 510 and outputs the video data to the at least one secondary output buffer 545 when the video data of the primary service channel is output by the multiplexer 530, and selects the video data of the primary service channel output by the decoder 510 and outputs the video data to the MDBF 540 if the video data of the at least one secondary service channel is output by the multiplexer 530.

As described above, the multiplexer 530 performs time division multiplexing on the frame data of the primary service channel and the at least one secondary service channel, and the decoder 510 decodes the video data output by the multiplexer 530. The decoder 510 can be configured to decode or not to decode according to the frame type of the video data. That is, the decoder 510 performs decoding on the video data of only the preset types of video frames of the at least one secondary service channel. The frame type check operation can be performed by the control unit 100, the decoder 510, or the protocol processing unit 120. In this embodiment, it is assumed that the decoder 510 performs the frame type check under the control of the control unit 100, and the multiplexed screen comprises video data of one primary service channel and one of the at least one secondary service channel.

The time division operation of the multiplexer 530 determines the decoding times for the primary service channel and the at least one secondary service channel in each time frame. The multiplexer 530 selects the video data of the primary service channel buffered within the primary input buffer 520 at the first half period of the frame and outputs the video data to the decoder 510, and selects the selected video data of the at least one secondary service channel buffered within the at least one secondary input buffer 525 at the last half period of the frame and outputs the selected video data to the decoder 510. The decoder 510 decodes the video data of primary service channel and the video data of I-frames of the at least one secondary service channel. In this embodiment, the decoder 510 can recognize the types of the video frames so as to decode the video data in different manners according to their frame types. That is, the decoder 510 performs decoding on the video data of the I-frames without movement compensation, P-frames with movement compensation using information on the previous I-frame, and B-frames with movement compensation using information on the past I or P frames and the future I or P frames. The decoder 510 is configured to decode the video data of all frame types for the primary service channel and the video data of I-frames for the at least one secondary service channel. The primary service channel and the at least one secondary service channel can be checked by the selection signal Sel1 applied to the multiplexer 530. The control unit 100 generates a control signal for the decoder 510 to decode the video data of the I-frames of the at least one secondary service channel. That is, the control unit 100 controls the decoder 510 to perform decoding operation in the period occupied by the video data of the primary service channel, and in the period occupied by the video data of I-frame of the at least one secondary service channel.

The decoder 510 decodes the video data of the primary service channel at the first half period of the time frame and the video data of the I-frames at the last half period of the time frame. At the periods that are occupied by the P and B-frames of the at least one secondary service channel, the decoder 510 is disabled. In this case, the control unit 100 generates the selection signal Sel2 for controlling the demultiplexer 353 to deliver the output of the decoder 510 to the MDBF 540 and SDBF 545. In accordance with the selection signal Sel2, the demultiplexer 353 outputs the video data of the primary service channel and the at least one secondary service channel to the MDBF 540 and SDBF 545 in the time frame having the video data of the I-frame of the at least one secondary service channel, outputs the video data of the primary service channel to the MDBF 540 in the time frame having no I-frame video data of the at least one secondary service channel.

Also, the I and P-frames of the secondary service channel can be used for generating the multiplexed screen. In this case, the multiplexer 530 performs multiplexing of the video data of the primary service channel and the at least one secondary service channel for every time frame (see 7d of FIG. 7) and outputs the multiplexed video data to the decoder 510. The decoder 510 decodes the video data of the primary service channel and the I and P-frames of the at least one secondary service channel. Next, the demultiplexer 535 performs demultiplexing the video data of the primary service channel and the at least one secondary service channel output by the decoder 510 (see 7e of FIG. 7) and outputs to the MDBF 540 and SDBF 545, respectively.

As described above, when the protocol processing unit 120 distinguishes the frame types of the at least one secondary service channel and selectively outputs the video data, the control unit 100 detects the frame type of the output video data and respectively generates the multiplexing selection and demultiplexing selection singles Sel1 and Sel2 (see 7f and 7g of FIG. 7). That is, the control unit 100 controls the multiplexer 530 to multiplex the video data of the primary service channel and the I-frames (or I and P-frames) of the at least one secondary service channel, and controls the demultiplexer 535 to demultiplex the video data of the primary service channel and the I-frames (or I and P-frames) of the at least one secondary service channel and respectively outputs the demultiplexed video data to the MDBF 540 and SDBF 545.

The coded video frame data is provided with the DTS and PTS. Since the video data are real time stream data, the presentation time for each frame data should be provided.

When using the DTS, the respective primary and at least one secondary input buffers 520 and 525 accumulative the frame data of the primary service channel and the at least one secondary service channel, the multiplexer 530 reads out the video frame data queued in the primary input buffer and the at least one secondary input buffers 520 and 525 to the decoder 510 at the time indicated by the DTS, the decoder 510 decodes the video frame data output by the multiplexer 530, and the demultiplexer 535 demultiplexes and outputs the video data to the MDBF 540 and SDBF 545. The video data buffered within the MDBF 540 and SDBF 545 are transmitted to the multiplexed screen processing unit 140 such that the multiplexed screen processing unit 140 merges the video data and displays the merged video data through the display unit 150 in the form of a multiplexed screen. Since the video data buffered in the input buffers 520 and 525 are decoded and displayed at the time indicated by the DTS, the MDBF 540 and SDBF 545 can be implemented having a small size.

In the case of using the PTS, the input buffers 520 and 525 respectively store the frame data of the primary service and the at least one secondary service channels, the multiplexer 530 multiplexes the video data output by the input buffers 520 and 525 and delivers the multiplexed video data to the decoder 510, the decoder 510 decodes the video frame data output by the multiplexer 530 and outputs the decoded video data to the demultiplexer 535, and the demultiplexer 534 demultiplexes the video data output by the decoder 510 and stores the demultiplexed video data within the MDBF 540 and SDBF 545. The MDBF 540 and SDBF 545 outputs the buffered video data to the multiplexed screen processing unit 140 at the time indicated by the PTS information such that the multiplexed screen processing unit 140 merges the video data of the primary service channel and the at least one secondary service channel and output the video data through the display unit 150 in the form of a multiplexed screen image. In the PTS-based decoding procedure, since the video data are immediately decoded and buffered within the MDBF 540 and SDBF 545 and output to be displayed at the time indicated by the PTS information, the decoder can be implemented having a small size MDBF 540 and SDBF 545.

The video decoder 500 receives the data bursts of the primary service channel and the at least one secondary service channels and decodes the video data contained in the data bursts per time frame. A time frame is divided into two periods such that the video data of the primary service channel are decoded in a half period and the second video data of the at least one secondary service channel are decoded in the other half period. In this manner, the frame video data of the primary service and the at least one secondary service channel are decoded by frame. Accordingly, the decoder 510 has a capability to decode the video data of both the primary service channel and the at least one secondary service channel in a frame. The decoder 510 can be implemented with an MPEG4 decoder or H.264 decoder.

Also, the video decoder can be implemented such that the video data of the primary service channel and the at least one secondary service channel are decoded by data burst. For example, the time frame ($\Delta t$) is divided into the first and second half periods such that the video data of the primary service channel are decoded at the first half period and the video data of the at least one secondary service channel are decoded at the second half period. In this case, the video data display may be delayed as much as ($\Delta t$), and the buffer size is increased to be larger than that in decoding by frame.

As described above, the decoded video data output by the video decoder 500 comprises the video data of the primary service channel and the at least one secondary service channel. The video data of the primary service channel is displayed in full screen view and the video data of the at least one secondary service channel is displayed in a partial screen view in the PIP format.

In the case that video data of the primary service channel and the at least one secondary service channel are displayed in the PIP format, the video data of the at least one secondary service channel can be resized in screen. The resizing process can be performed by the video decoder 500 or the multiplexed screen processing unit 140.

The primary video screen and the at least one secondary video screen for displaying the video data of the primary service channel and the at least one secondary service channel can be arranged on the display screen of the display unit 150 in the same aspect ratio. Also, the at least one secondary video screen can be arranged at one part of the primary video screen displayed in the full screen view. The at least one secondary video screen can be presented at a fixed position or can be moved on the primary video screen.

Figure 8A:
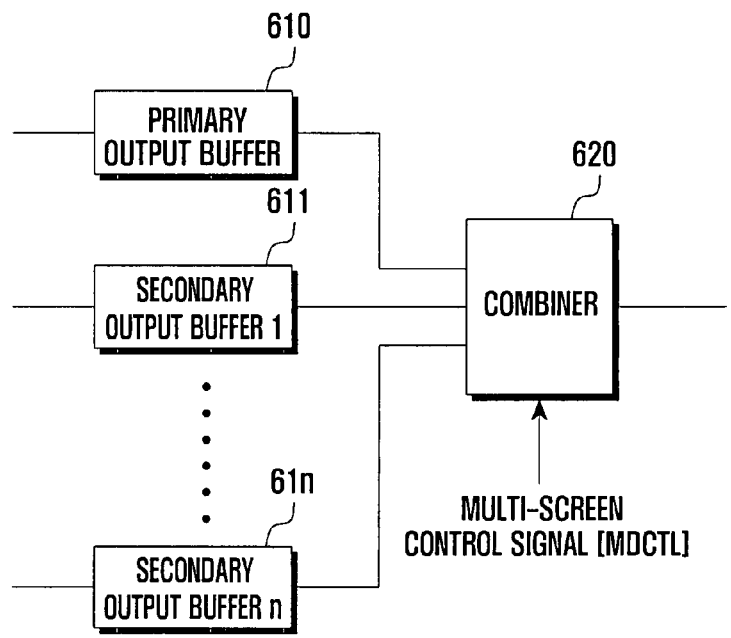
FIGS. 8A to 8C are block diagrams illustrating configurations of the multiplexed screen processing unit of FIG. 1 according to exemplary embodiments of the present invention.
Figure 8B:
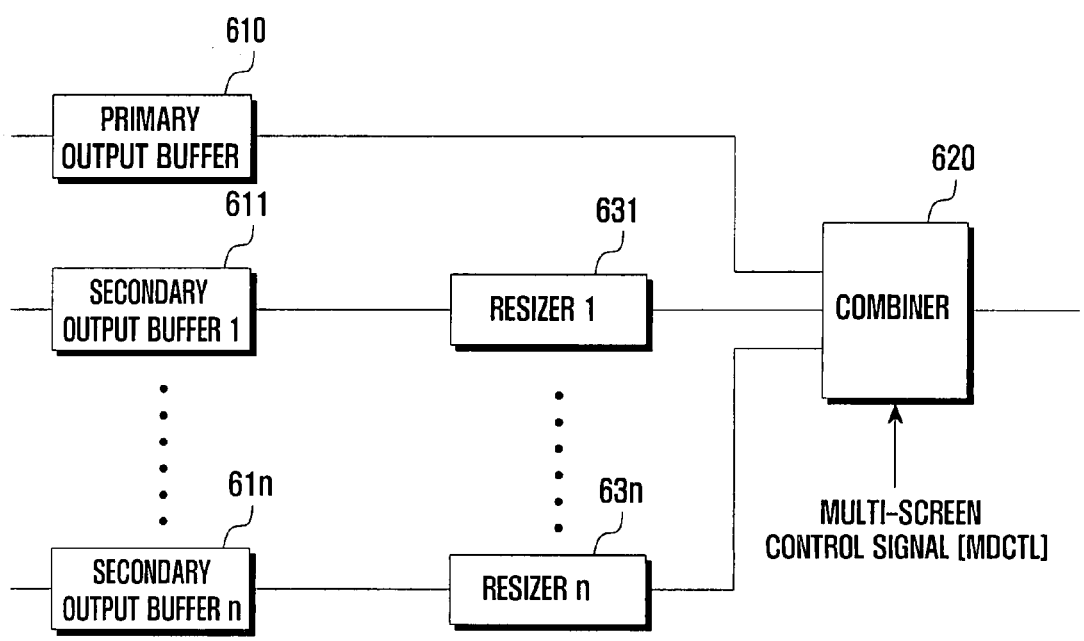
Figure 8C:
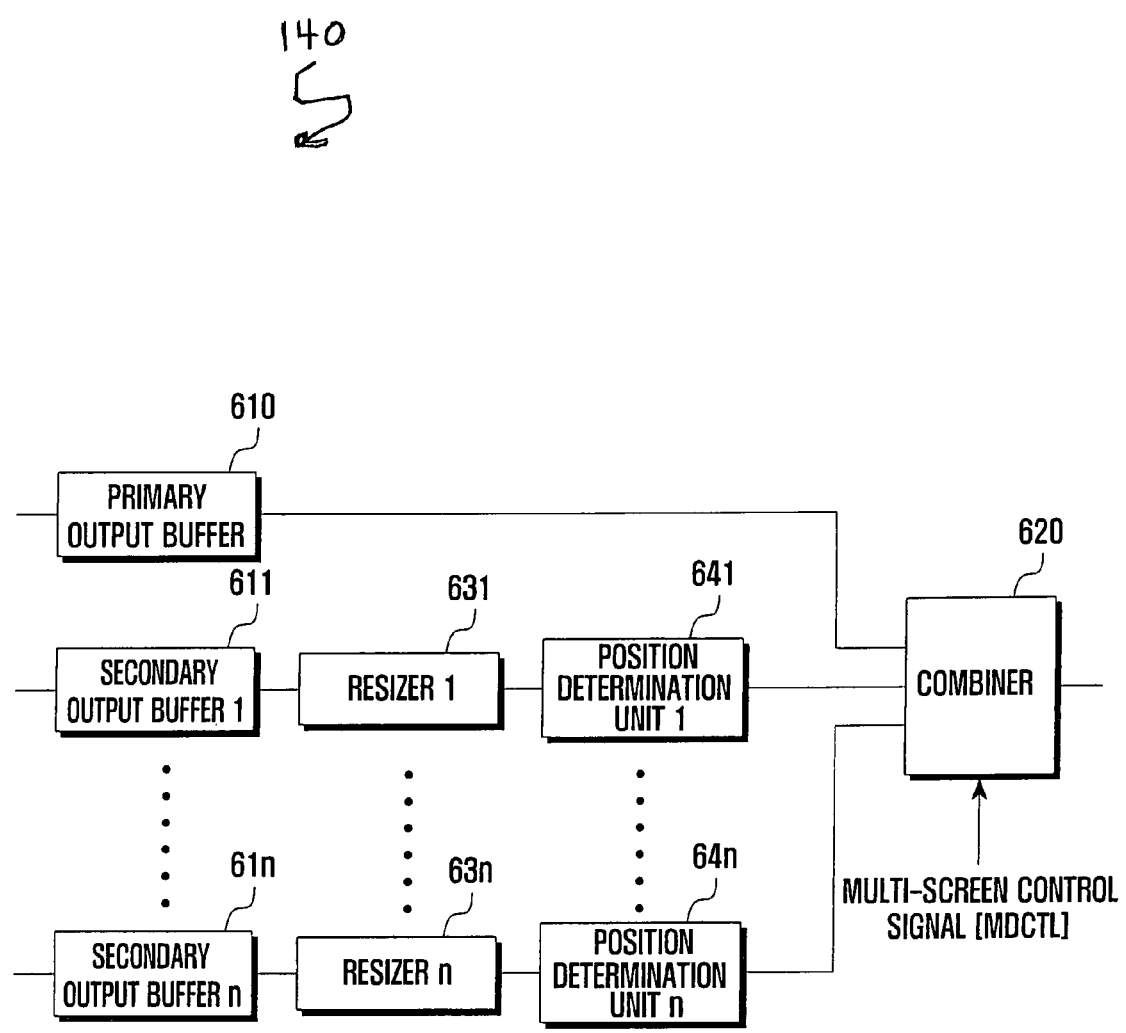

FIGS. 8A to 8C are block diagrams illustrating configurations of the multiplexed screen processing unit 140 of FIG. 1 according to exemplary embodiments of the present invention.

In FIGS. 8A to 8C, the primary output buffer 610 can be implemented as the MDBF 540 of FIG. 6, and the at least one secondary output buffer 611 to 61n can be implemented as the at least one secondary output buffer 545 of FIG. 6. That is, the output buffers 610 and 611 to 61$n$ of the multiplexed screen processing unit 140 can be replaced by the MDBF 540 and SDBF 545 of the video decoder 500.

FIG. 8A illustrates a configuration of the multiplexed screen processing unit when the video data of the at least one secondary service channel output by the video decoder 500 are received with or without resizing process and the secondary video screen is displayed at a fixed position of the display screen of the display unit 150. FIG. 8B illustrates a configuration of the multiplexed screen processing unit when the video data are received after being resized at the video decoder 500 and the at least one secondary video screen is displayed at a fixed position of the display screen of the display unit 150. FIG. 8C illustrates a configuration of the multiplexed screen processing unit when the video data are received after being resized at the video decoder 500 and the secondary video screens are arranged at positions selected by the user. In FIGS. 8A to 8C, although a plurality of secondary output buffers 611 to 61N are depicted, the multiplexed screen generation operation is described with only one secondary output buffer 611 in the following description for simplifying the explanation.

In the multi-screen mode, the aspects and positions of the primary screen for displaying the video data of the primary service channel and the secondary screen for displaying the video data of the secondary service channel are preset. For example, when the primary and secondary screens are displayed in the PIP format, the secondary screen is displayed at a predetermined position of the primary screen, which is in full screen view, with a predetermined size. The position and size of the secondary screen can be set by the user or fixed. If the position and size of the secondary are determined, the control unit 100 controls the combiner 620 to merge the video data of the primary and secondary service channels and output the merged video data in the form of multiplexed screen image. Assuming that the display unit 150 supports 1600*900 resolution (1600 pixels per row and 900 pixels per column) and the PIP inset screen, i.e. the secondary screen, is defined by $451^{st}$ to $900^{th}$ pixels in column and $801^{st}$ to $1600^{th}$ pixels in row, the control units 100 generates display control signal such that pixels on the $1^{st}$ to $450^{th}$ rows receives the pixel data for the video data of the primary service channel. Also, the control unit 100 generates display control signal such that the $1^{st}$ to $800^{th}$ pixels on the $451^{st}$ to $900^{th}$ rows receive the pixel data for the video data of the primary service channel and the $801^{st}$ to $1600^{th}$ pixels on the $451^{st}$ to $900^{th}$ rows receive the pixel data for the video data of the secondary service channel. As described above, the control unit 100 transmits the multi-screen display control signal (MDCTL) to the combiner 620 such that the combiner 620 outputs the pixel data for displaying the video data buffered in the secondary output buffer 611 for the secondary service channel in the PIP inset screen and the pixel data for displaying the video data buffered in the primary output buffer 610 for the primary service channel in the full screen except for the region occupied by the PIP inset screen. That is the combiner 620 selectively reads out the video data respectively buffered in the primary and secondary output buffer 610 and 611 to the display unit 150 on the basis of the multi-screen display control signal (MDCTL), whereby the video data of the secondary service channel is displayed in the PIP inset screen while the video data of the primary service channel is displayed on the full screen.

The combiner 620 can be implemented with a multiplexer or a blender. The blender can blend the video data of the primary and secondary service channels such that the blended video data are displayed in the PIP format. That is, the blender can display the primary screen and secondary screen on different layers and switch the layers in depth. In the following description, the primary screen is placed on a bottom layer as a full screen and the secondary screen is placed on a top layer as an inset screen. The blender can support various display modes such as normal mode, multiply mode, screen mode, overlay mode, soft light mode, and color mode. In the normal mode the two layers do not affect with each other. According to the characteristics of the layers, the top layer can cover the bottom layer. The multiply mode multiplies colors of the two layers. The screen mode inverts the colors of the two layers and multiplies the inverted colors. The overlay mode displays the top layer in association with the color of the bottom layer such that bright image becomes much brighter and dark image becomes much darker. The soft light mode displays the image brightly or darkly relative to 50% gray. The color mode presents an image by mixing the brightness f the bottom layer and the color and freshness. The blender can use an alpha blending technique for mixing the layers according to a constant value.

When the combiner 620 is implemented with a multiplexer, the control unit 100 multiplexes the video data of the primary and secondary service channel such that the video data of the primary service channel are displayed in full screen and the video data of the secondary service channel are displayed in the inset screen. That is, the demultiplexer outputs the video data of the primary service channel in the region designated for the primary screen and the video data of the secondary service channel in the region designated for the secondary screen on the display unit 150. In this case, the video data of the primary service channel corresponding to the secondary screen are not displayed.

When the combiner is implemented with the blender, the video data of the primary and secondary service channels corresponding to the secondary screen are assigned weights. That is, if the video data of the second service channel are weighted to be overlaid on the video data of the primary service channel (i.e., weight=0 for the primary service channel, and weigh=1 for the secondary service channel), the video data of the secondary service channel are displayed in the secondary screen, i.e. the PIP inset screen on the primary screen. If the weight value of the video data of the primary service channel is higher than that of the secondary service channel, the primary screen is overlaid on the secondary screen.

Referring to FIG. 8A, the primary output buffer 610 stores the video data of the primary service channel, and the secondary output buffer 611 stores the video data of the secondary service channel, the video data being decoded by the video decoder 500. The multiplexed screen processing unit 140 is configured as depicted in FIG. 8A, when the position and size of the inset screen are set in the display unit 150. In this case, the position and size of the inset screen cannot be changed by user. Accordingly, the combiner 620 outputs the video data of the secondary service channel buffered in the secondary output buffer 611 to the secondary screen while outputting the video data of the primary service channel stored in the primary output buffer 610 in the primary screen.

Referring to FIG. 8B, the primary output buffer 610 stores the video data of the primary service channel, and the secondary output buffer 611 stores the video data of the secondary service channel, the video data being decoded by the video decoder 500. The multiplexed screen processing unit 140 is configured as depicted in FIG. 8B to allow adjusting the size of the secondary screen. In this case, the user can adjust the size of the secondary screen at a fixed position.

In order to enable adjusting the size of the secondary screen, the video data of the secondary service channel can be resized by the decoder 510. However, if the decoder 510 does not resize the video data of the secondary service channel, the video data can be resized by resizer 631 of the multiplexed screen processing unit 140. The resizing level of the video data of the secondary service channel can be decided by the user, or set to default value. The size of the secondary screen can be set using an option selection screen for setting the multi-screen mode. If the size of the secondary screen is set, the control unit 100 determines the resizing level on the basis of the user setting, and otherwise, the control unit 100 selects one of preset resizing levels. The control unit 100 also sets the resizer 631 with the resizing level. The resizer 321 can be implemented with a scaler. The scaler removes the pixels of the secondary service channels regularly in accordance with the resizing level without damaging video quality. The scaler can be configured to select the pixels of specific regions of the entire video data to be displayed. In this case, the secondary screen displays the pixels of the specific region of the entire screen.

The combiner 620 outputs the video data of the primary service channel stored in the primary output buffer 610 and the video data of the secondary service channel stored in the secondary output buffer 611 at a preset position under the control of the control unit 100. As described above, the combiner 620 can be implemented with a multiplexer or a blender.

Referring to FIG. 8C, the primary output buffer 610 stores the video data of the primary service channel, and the secondary output buffer 611 stores the video data of the secondary service channel, the video data being decoded by the video decoder 500. The multiplexed screen processing unit 140 is configured as depicted in FIG. 8C to allow adjusting the size and position of the secondary screen. In this case, the user can adjust the size and position of the secondary screen.

The secondary screen can be arranged at a fixed position in a fixed size or at a specific position in a specific size according to the user manipulation on the display unit 150. In order to enable adjusting the size and position of the secondary screen, the multiplexed screen processing unit includes the resizer 631 and a position determination unit 641. The control unit 100 controls the position determination unit 641 to determine the position of the secondary screen. The position of the secondary screen can be set using an option selection screen for setting the multi-screen mode. If the position of the secondary screen is set, the control unit 100 controls the position determination unit 641 to determine the position of the secondary screen according to the option set by the user. If the position of the secondary screen is not set by the user, the control unit 100 controls the position determination unit 641 to set a default position of the secondary screen.

The combiner 620 outputs the video data of the primary service channel stored in the primary output buffer 610 and the video data of the secondary service channel stored in the secondary output buffer 611 at a preset position under the control of the control unit 100. As described above, the combiner 620 can be implemented with a multiplexer or a blender.

As illustrated in FIG. 8C, the resizer 631 and the position determination unit 641 are arranged between the secondary output buffer 611 and the combiner 620 in series. In this case, the control unit 100 controls the resizer 631 and the position determination unit 641 to adjust the size and position of the secondary screen.

By configuring the multiplexed screen processing unit 140, the secondary screen can be displayed in the form of an inset screen while the primary screen is displayed in the full screen format.

The arrangement of the resizer 631 and the position determination unit 641 can changed such that the position of the secondary screen is firstly determined and then the size of the secondary screen is adjusted.

Although the multiplexed screen processing unit 140 of FIG. 8C includes the resizer 631 and the position determination unit 641, the resizer 631 can be omitted. In this case, the secondary screen is displayed in a fixed size.

Although the multi-screen display is described with a single secondary screen in FIGS. 8A to 8C, the number of the secondary screens can be increased to 2 or more. In previous discussions this has been indicated by the 'at least one secondary screen' terminology.

When displaying the video data of the primary and secondary service channels in the multiplexed screen format, the primary and secondary screens for primary and secondary service channels can be arranged in the same size. In this case, an additional resizer for resizing the primary screen can be used. That is, the video data of the primary and secondary service channels are resized by separate resizers to be displayed in the primary and secondary screens having the same size. When the primary screen is not displayed in the full screen and differs from the secondary screen in size, the separate resizer can be used.

As described above, the digital broadcast receiver can display video data of the multiple broadcast channels at the same time in the multi-screen mode.

The multiplexed screen display function can be used in association with channel navigation function. That is, when the user want to navigate service channels, the user can activate the multi-screen display mode and select the secondary screen for navigating the service channels in the secondary screen while viewing the primary service channel in the primary screen. If a switching command is input while navigating the service channel in the secondary screen, the control unit 100 switches the secondary service channel into the primary service channel such that the service channel selected in the secondary screen are displayed in the primary screen as a new primary service channel.

A multi-screen display operation of the above-structured broadcast receiver is described hereinafter.

Figure 9:
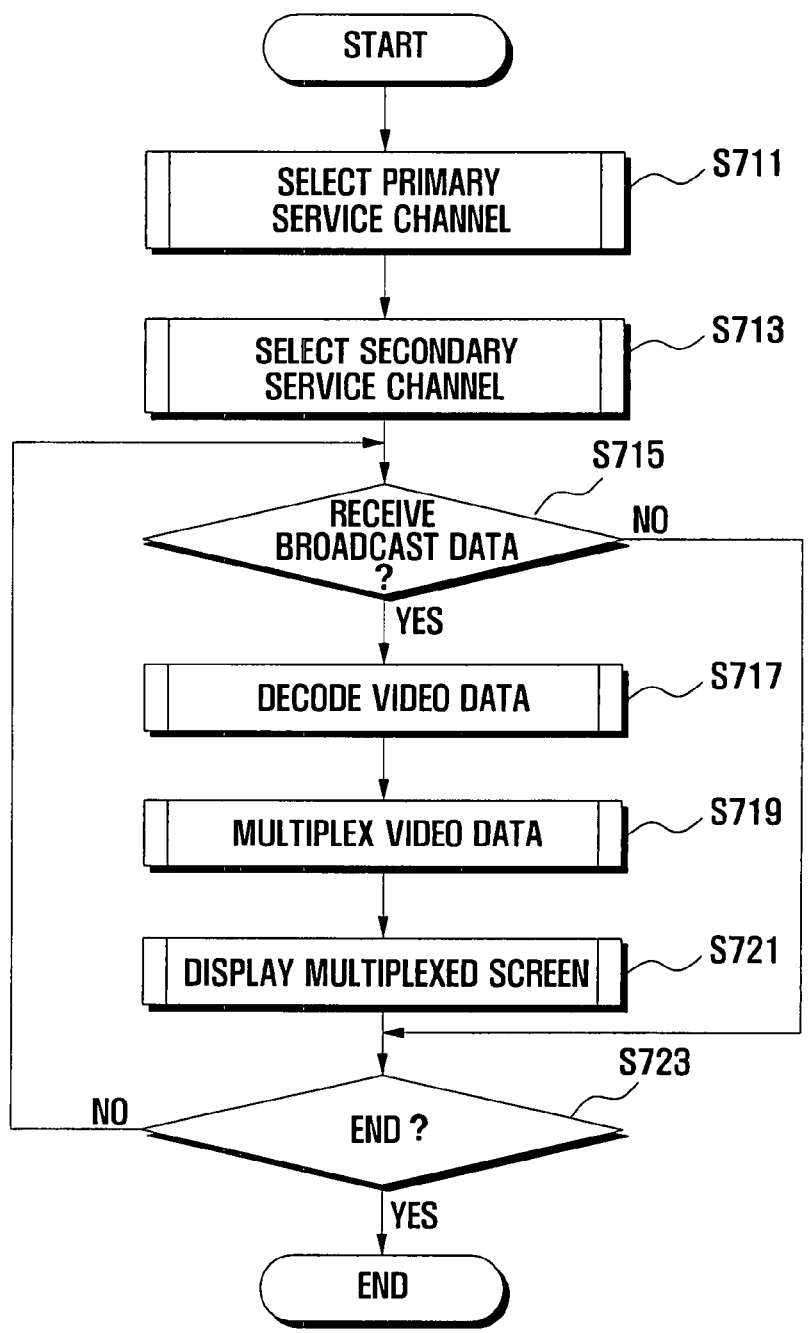
FIG. 9 is a flowchart illustrating a multi-screen display method according to an exemplary embodiment of the present invention.

FIG. 9 is a flowchart illustrating a multi-screen display method according to an exemplary embodiment of the present invention.

Referring to FIG. 9, if a multi-screen mode enable command is input by a user, the control unit 100 controls to displays a channel selection widow for guiding selections of a primary service channel and at least one secondary service channel. The primary and secondary service channels can be selected by inputting corresponding channel numbers. If a primary service channel selection command is input, the control unit 100 configures the digital broadcast receiver with the primary service channel information (S711). The primary service channel information includes PID, IP address, and port number. The PID can be obtained by analyzing the PSI/SI received by the broadcast reception unit 110 and the IP address and port number can be checked from the SDP of the ESG.

Next, the control unit 100 can display information for helping selection of the at least one secondary service channel on the display unit 150. The information includes channel number of the at least one secondary service channel, and frame selection option, and size and position of the at least one secondary screen for displaying the at least one secondary service channel. The frame selection option gives the information for selectively capturing the video data of I-frames, or I and P-frames. Also, the frame selection option can indicate a specific frame of the frames per second. For example, in the case of frame rate of 30 frames per second, the frame selection option can be set for indicating a specific frame such as $10^{th}$ or $20^{th}$ frame among the 30 frames. If the frame selection option is not set, the control unit 100 sets the frame selection option to default value (for example, a value for I-frames). The control unit 100 configures the digital broadcast receiver with the at least one secondary service channel in accordance with information set by the user (S713). If the channel number of the at least one secondary service channel is provided by the user, the control unit 100 sets the broadcast reception unit with the PID, IP address, and port number on the basis of PSI/SI and SDP. If the frame selection option is selected, the control unit 100 configures the control signals for controlling the multiplexing, decoding, and demultiplexing operations of the video decoder 500. If an instruction is provided by the user for selecting a size of the at least one secondary screen for displaying the at least one secondary service channel, the control unit 100 controls the decoding unit 130 or the multiplexed screen processing unit 140 to set the resizing level of the at least one secondary screen. In this embodiment, the resizing function is performed by the multiplexed screen processing unit 140. If the size of the secondary screen is not set by the user, the control unit 100 sets the size of the at least one secondary screen to a predetermined default level. If an instruction is provided by the user for selecting a position of the at least one secondary screen, the control unit 100 sets the multiplexed screen processing unit 140 with the position indicated by the position selection instruction, and otherwise, the multiplexed screen processing unit 140 is set with a pre-determined default position value.

After the primary service channel and the at least one secondary service channel are determined at steps S711 and S713, the control unit 100 checks the PIDs of the primary service channel and the at least one secondary service channel and their burst-on times in the time frame and transmits the PIDs and burst-on time information to the demodulation controller 240. The demodulation controller 140 controls time slicing such that the broadcast reception unit 110 is switched on at the burst-on times and the demodulator 220 performs demodulation on the data burst of the primary service channel and the at least one secondary service channel. The demodulated data are output in the TS format (see 4a of FIG. 4). The demodulation control unit 240 sets the PID filter 230 with the PIDs of the primary service channel and the at least one secondary service channels such that the PID filter 230 filters the broadcast data having the PIDs of the primary service channel and the at least one secondary service channel. The demodulation controller 240 performs MPE-FEC correction on the broadcast data output by the PID filter 230 and outputs the IP datagram (see 4c of FIG. 4).

After decapsulating the IP datagram, the control unit 100 determines whether broadcast data of the primary service channel and the at least one secondary service channel are carried by the IP datagram (S715). If broadcast data of the primary service channel and the at least one secondary service channel are contained in the IP datagram, the control unit 100 controls to decode the broadcast data (S717). Here, the broadcast data are burst data of the primary service channel and the at least one secondary service channel comprising of a plurality of video frames. The decoder 510 decodes the burst data in units of a frame and the video data of the primary service channel and the at least one secondary service channel are decoded by time frame (see 7b to 7g of FIG. 7). The video decoder 500 performs decoding video data of every time frame of the primary service channel and delivers the decoded video data to the multiplexed screen processing unit 140. Also, the video decoder 500 performs decoding video data of preset frames of the at least one secondary service channel and delivers the video data to the multiplexed screen processing unit 140.

That is, when the time frame carries the predetermined video frame of the at least one secondary service channel, the video decoder 500 divides the time frame and decodes the video data of all types of video frames of the primary service channel and the video data of preset type of video frames of the at least one secondary service channel, and transmits the decoded video data of the primary service channel and the at least one secondary service channel to the multiplexed screen processing unit 140. In the case that the time frame carries no preset type of video frames of the at least one secondary service channel, the video decoder 500 decodes only the video data of the primary service channel and transmits the decoded video data to the multiplexed screen processing unit 140.

When a primary service channel and a one secondary service channel are selected, the video data of the primary service channel is decoded at a first half period of the time frame, and the video data of the one secondary service channel are decoded at a second half period of the time frame. When a primary service channel and two secondary service channels are selected, the time frame is divided into 3 periods such that the video data of the primary service channel are decoded at a first period, the video data of a first secondary service channel are decoded at a second period, and the video data of a second secondary service channel are decoded at a last period. Accordingly, the video decoder must support the decoding rate capable of decoding the video data of a primary service channel and at least one secondary service channel in a time frame.

Figure 10:
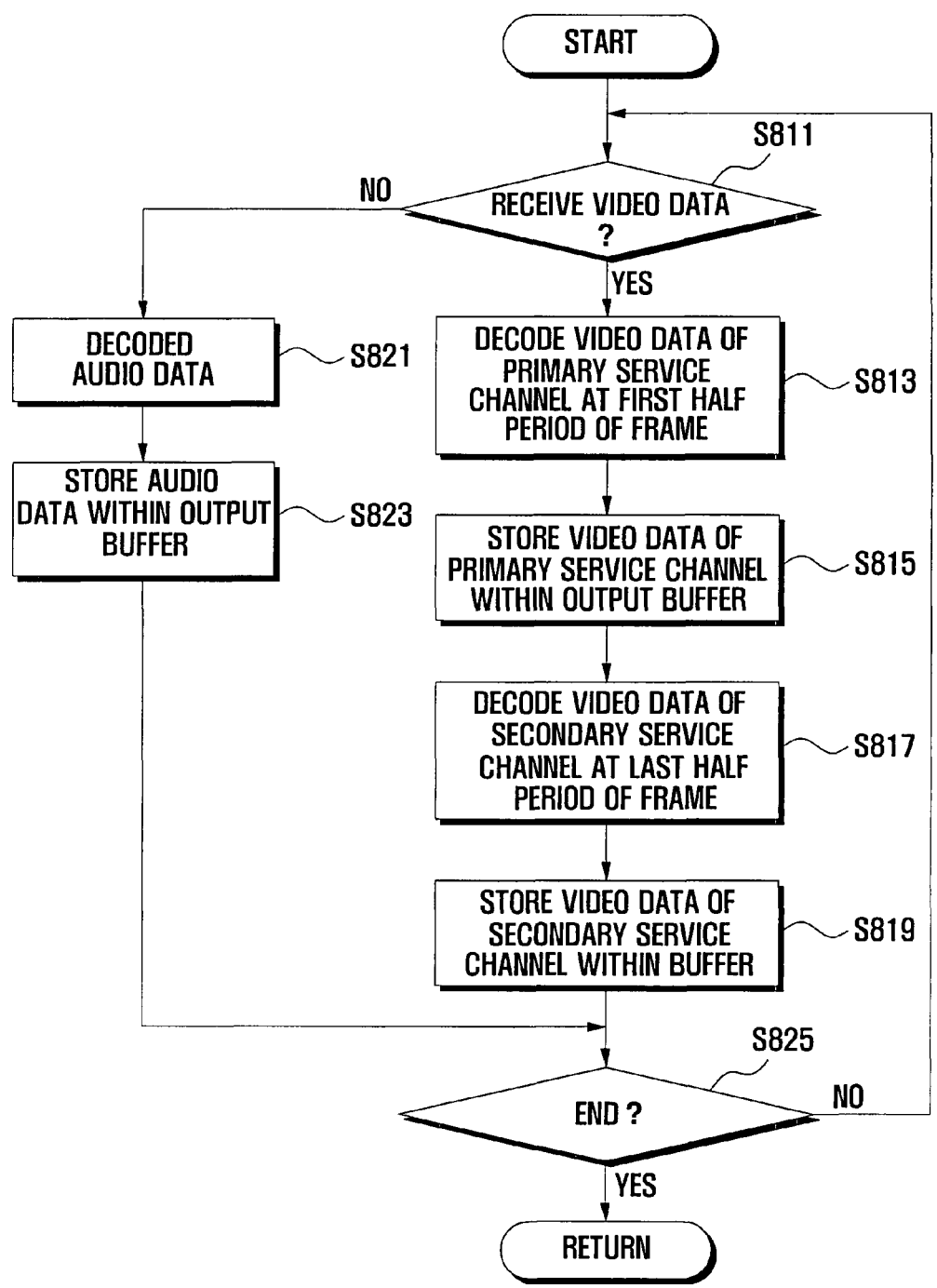
FIG. 10 is a flowchart illustrating a decoding procedure 717 of the multi-screen display method of the exemplary embodiment of the present invention of the flowchart illustrated in FIG. 9.

FIG. 10 is a flowchart illustrating a decoding procedure 717 of the multi-screen display method of FIG. 9. FIG. 10 is depicted under the assumption in that the video and audio data of the primary service channel are processed first and then the video data of the at least one secondary service channel are processed. In this case, both the video and audio data of the primary service channel and the video data of the at least one secondary service channel are decoded at the step S717 of FIG. 9.

In the following description, it is assumed that the multiplexed screen comprises the video data of one primary service channel and one secondary service channel.

Referring to FIG. 10, if the broadcast data is received, the control unit 100 checks whether the broadcast data are belonged to the primary service channel or the secondary service channel. If the broadcast data are belonged to the primary service channel, the control unit 100 controls the decoding unit 130 to decode the video and audio data and store the video and audio data within the primary input buffer 520 and an audio input buffer (not illustrated), respectively.

If the broadcast data belong to the secondary service channel, the control unit 100 controls the decoding unit 130 to decode the video and audio data of the secondary service channel and store the decoded video data within the secondary input buffer 525. When the protocol processing unit 120 is configured to check the types of the video frames of the secondary service channel, the control unit 100 controls the protocol processing unit 120 to selectively output the preset type of video frame to the secondary input buffer 525. If the protocol processing unit 120 does not distinguish the video frame types, the video data of all the types of the secondary service channels are stored in the secondary input buffer 525.

Next, the control unit 100 controls the video decoder 500 and audio decoder 590 to decode the video and audio data buffered in the primary and secondary input buffers 520 and 525.

The audio and video data stored in the input buffers 520 and 525 are coded video data and thus the control unit 100 knows the decoding start time (for example, the decoding start time can be provided using V-DTS(A-DTS) and V-PTS(A_PTS)). Using the DTS and PTS information, the audio and video decoding start times can be determined. The control unit 100 controls decoding times of the video data stored in the input buffers 520 and 525 and audio data stored in an audio input buffer (not illustrated).

If an audio decoding time is on, the control unit 100 detects the audio decoding time at step S811 and controls the decoding unit 130 to decode the audio data (S821) in accordance therewith and stores the decoded audio data within an audio output buffer (S823). The steps S821 and S823 are iteratively performed, and the audio data buffered in the audio output buffer are played out through the speaker unit 155 in synchronization with the video data of the primary service channel.

If a video decoding time is on, the control unit 100 detects the video decoding time at step S811 and controls the decoding unit 130 to decode the video data of the primary and secondary service channels by time frame through steps S813 to S819. That is, the control unit 100 controls the decoding unit 130 to decode the video data of the primary service channel stored in the primary input buffer 520 at the first half period of the time frame (S813) and stores the decoded video data within the MDBF 540 (S815). Next, the control unit 100 controls the decoding unit 130 to decode the video data of the secondary service channel stored in the secondary input buffer 525 at the last half period of the time frame (S817) and stores the decoded video data within the secondary output buffer 545 (S819). In order to decode the video data of the secondary service channel, the control unit 100 checks the time frames carrying preset types of video frames (for example, I-frames, or I and P-frames). If the time frame carries the preset type of video frame, the control unit 100 controls the video data of the secondary service channel of the time frame, and otherwise decoding the video data for the secondary service channel is skipped. The video data decoding is iteratively performed by time frame, and the decoded video data stored within the MDBF 540 and SDBF 545 are displayed in the multiplexed screen format on the display unit 150 together with the output of the audio data of the secondary service channel through the speaker unit 155.

In the case that the video decoder 500 is implemented with a resizing function, the video data can be resized during the decoding process.

As described above, the control unit 100 controls to decode the video data of the secondary service channels at the respective first half period and last half period of a time frame. Accordingly, the video decoder should have a capability for decoding two or more video frames in a time frame.

Next, the control unit 100 controls the decoding unit 130 to transmit the decoded video data to the multiplexed screen processing unit 140 such that the multiplexed screen processing unit 140 combines the video data of the primary and secondary service channels and generates a multiplexed screen composed of a primary screen for displaying the primary service channel and a secondary screen for displaying the secondary service channel (S719). The primary and secondary screens can be formed in a split screen format such that the two screens have the same size. Also, the primary and secondary screens can be formed in a PIP screen such that the secondary screen is displayed as an inset screen while the primary screen is displayed in full screen. The size of the inset screen can be fixed or resized in accordance with a user intention. Also, the position of the secondary screen can be fixed or moved in accordance with a user intension.

Figure 11A:
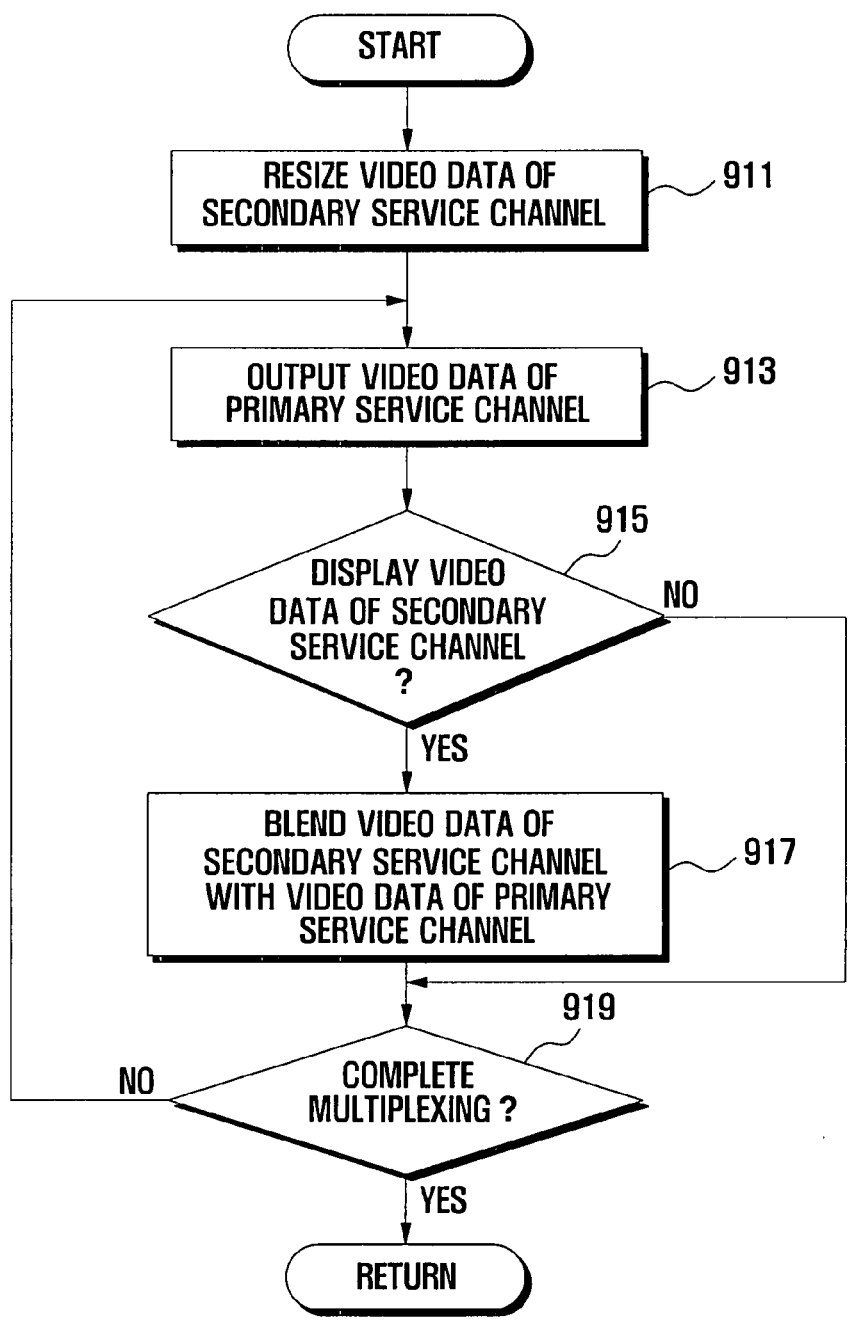
FIGS. 11A and 11B are flowcharts illustrating a multiplexed screen processing procedure of the exemplary embodiment of the present invention of the flowchart illustrated in FIG. 9.
Figure 11B:
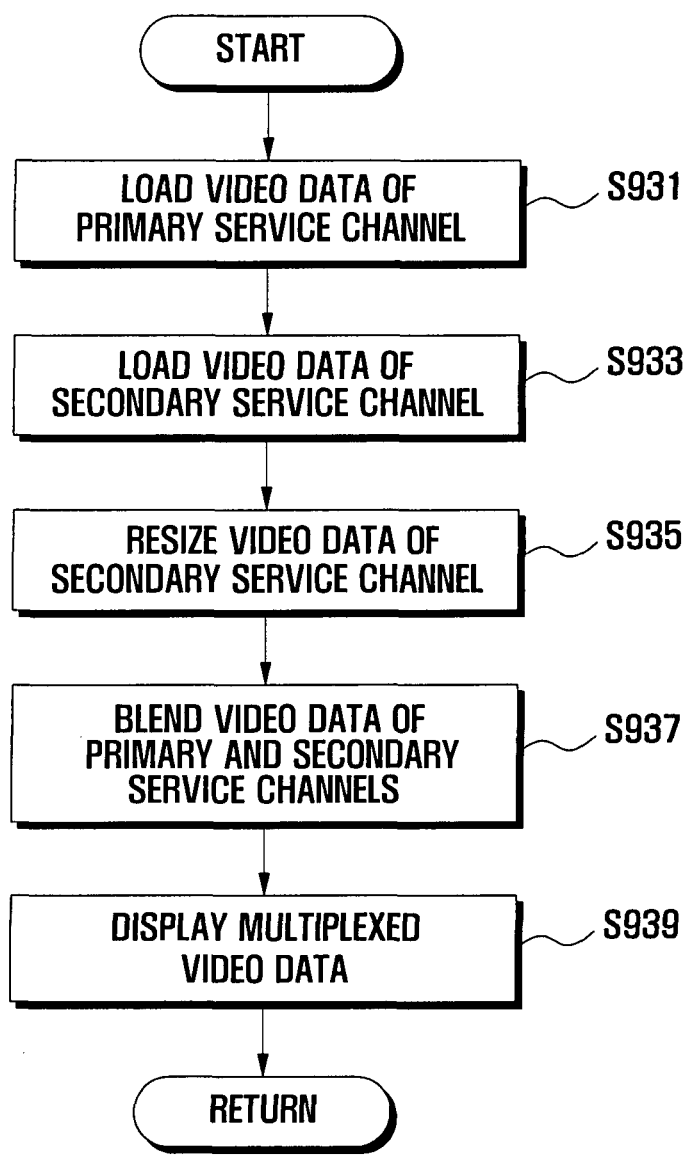

FIGS. 11A and 11B are flowcharts illustrating a multiplexed screen processing procedure of FIG. 9. FIGS. 11A and 11B particularly illustrate the procedures for resizing the video data of the secondary service channel and displaying the video in the form of a PIP inset screen.

Referring to FIG. 11A, the control unit 100 controls the multiplexed screen processing unit 140 to read and resize the video data of the secondary service channel stored in the secondary output buffer 545. The target size of the second screen can be set to a pre-set default value or an option value selected by the user. The resizer can be implemented with a scaler. The scaler can scale down the entire pixels of the video data or regularly trim the pixels of the video data to resize the secondary screen. During or after the video data resizing process, the control unit 100 reads out the video data of the primary service channel stored in the primary output buffer to the display unit 150 such that the video data of the primary service channel is displayed in the primary screen (S913). Next, the control unit 100 detects a region at which the secondary screen is arranged. If the screen display region is detected at step S915, the control unit 100 performs blending the video data of the primary service channel and the secondary service channel at the region (S917). At this time, the video data of the primary and secondary service channels are multiplexed such that the video data of the secondary service channel are displayed in the PIP inset screen and the video data of the primary service channels are displayed in full screen except for the region of the PIP inset screen. Also, the video data of the primary service channel can be displayed in the full screen such that the video data of the secondary service channels are blended with the video data of the primary service channel at the region of the PIP inset screen.

In the above explained manner, the control unit 100 controls the display unit 150 to display the video data of the primary service channel in the full screen format and the resized video data of the secondary service channel in the PIP inset screen. The screen multiplexing process is performed by frame such that the video data of the primary and secondary service channels are displayed in multiplexed screen format. If the video data of the primary and secondary service channels of one frame are multiplexed, the control unit 100 detects the completion of the multiplexing (S919) and starts multiplexing the video data of the next frame.

The video data multiplexing is performed in an order of determining a secondary screen on the display unit 150, displaying the video data of the secondary service channel in the secondary screen, and displaying the video data of the primary service channel in the full screen expect for the region occupied by the secondary screen.

FIG. 11B is a flowchart illustrating a multiplexed screen processing procedure of FIG. 9 according to another exemplary embodiment of the present invention.

Referring to FIG. 11B, the control unit 100 loads the video data of the primary and secondary service channels stored in the MDBF 540 and SDBF 545 at every frame interval (S931 and S933). Next, the control unit 100 performs resizing the video data of the secondary service channel (S935) and blends the resized video data of the secondary service channel with the video data of the primary service channel (S937). In the blending process, the video data of the secondary service channel is weighted so as to be displayed in the secondary screen, i.e. PIP inset screen. Consequently, the control unit 100 stores the blended video data within a final output buffer so as to be displayed through the display unit 150 (S939).

The above-structured received digital broadcast can be integrated into a mobile terminal.

FIG. 12 is a block diagram illustrating a mobile terminal equipped with a digital broadcast receiver according to an exemplary embodiment of the present invention.

Referring to FIG. 12, the mobile terminal includes a control unit 100, a broadcast reception unit 110, a protocol processing unit 120, a decoding unit 130, a multiplexed screen processing unit 140, a display unit 150, a speaker unit 155, a memory unit 160, a key input unit 170, and a radio frequency (RF) unit 190. In such configuration, the control unit 100 controls both the radio communication and broadcast playback functions of the mobile terminal. The RF unit 190 includes a frequency converter for performing frequency up-conversion on the transmit signals and frequency down-conversion on the received signals. The RF unit 190 also includes a modem for modulating the transmit signal and demodulating the received signal and a codec for coding the transmit signal and decoding the received signal. The modem and codec can be integrated into the control unit.

When the mobile terminal operates in a communication mode, the digital broadcast receiver is disabled, and the RF communication function is enabled with the operation of the RF unit 190.

The digital broadcast receiver embedded in the mobile terminal plays the broadcast data of a service channel selected by the user and enables the RF unit 190, when it is required to communicate with a service provider or a broadcast station, to establish a return channel.

The digital broadcast receiver can display two or more service channels in a multiplexed screen format. The digital broadcast receiver includes the broadcast reception unit 110, protocol processing unit 120, decoding unit 130, and multiplexed screen processing unit 140 that are implemented as the parts of the mobile terminal.

When the digital broadcast receiver operates in a multi-screen display mode, the mobile terminal allows the user to select at least two service channels. One of the two service channels is displayed in a primary screen. The service channel displayed in the primary screen is called primary service channel. The other service channel is called a secondary service channel and displayed in a secondary screen. At least one secondary service channel can be selected and the secondary screen is displayed in the form of a PIP inset screen. In the multi-screen display mode, the broadcast reception unit 110 performs time slicing control for receiving data burst of the primary and secondary service channels and receives the broadcast data of the primary and secondary service channels by checking their PIDs. The protocol processing unit 120 performs protocol processing on the broadcast data received by the broadcast reception unit 110 and outputs video and audio data extracted from the broadcast data to primary and secondary input buffers.

The decoding unit 130 reads out and decodes the video data stored in the input buffers 520 and 525 in unit of frame. The decoding unit 130 includes an audio decoder 590 and a video decoder 500, and the video decoder 500 decodes the video frame data of the primary and secondary service channels by time frame. That is, the video decoder can decode at least two video frames in a frame interval. The two video frames can be the video frames belonged to the primary and secondary service channels. The video decoder 500 can be implemented with data resizing function so as to resize the video data of the secondary service channel and before decoding the video data.

The multiplexed screen processing unit 140 multiplexes the video data of the primary and secondary service channel output by the decoding unit 130 and generates a multiplexed screen image. The multiplexed screen image can be composed of primary and secondary screens having the same size. The size of the secondary screen can be determined by user selection or as a default size. In this case, the video data of the secondary service channel are resized to be suitable for the secondary screen. The video data of the secondary service channel can be resized by processing the entire pixels or trimming some parts of the entire pixels. Also, the secondary screen can be placed at a position determined by the user or at a default position. When the position of the secondary screen is determined by the user, the multiplexed screen processing unit 140 checks the position and arranges the second screen at the position such that the video data of the secondary service channel are displayed in the second screen.

If an incoming call is detected while the mobile terminal operates in the multi-screen display mode, the control unit 100 generates an incoming call alert. The mobile terminal can be set with an incoming call alert mode. The incoming call alert mode includes a normal ringer mode and a mute mode. When the normal ringer mode is set, the control unit 100 indicates the incoming call using a ring tone such as melody, bell, and music together with display of caller information. The mute mode includes a vibrating mode and an announcement mode. In the case of the vibrating mode, the control unit 100 indicates the incoming call by vibrating the mobile terminal using a motor (not illustrated) together with a display of the caller information. When announcement mode is set, the control unit 100 displays an announcement message indicating an incoming call together with the caller information. The announcement message can be blinked for attracting user attention. The announcement message and caller information can be displayed on the multiplexed broadcast screen. The incoming call alert mode can be automatically set as the announcement message mode in the broadcast playback mode, since the user is likely to watch the display screen.

The mobile terminal can be configured such that an outgoing call request can be input by the user in the broadcast playback mode. This is because the digital broadcast can support an interactive program requiring user feedback. For example, the user may need to communicate with for ordering a good or service while watching a shopping program of a specific service channel. Also, the user can participate in an entertainment or gaming program. Since the digital broadcast receiver supports unidirectional communication, the program-related communication channel is established using the RF unit 190. This is because the mobile terminal supports the radio communication using the RF unit 190. The control unit 100 can check the information on the program provider such as phone number and IP address of a department managing the program on the service channel). That is, in the case of DVB-H enabled mobile terminal, the control unit 100 can obtain the phone number and IP address associated with the program of the service channel from the ESG. In the case of DMB-enabled mobile terminal, such information can obtain from the EPG. Accordingly, if an outgoing call request is input by the user while the mobile terminal operates in the broadcast playback mode, the mobile terminal establishes a communication channel to the phone number by means of RF unit 190 such that the user can transmit a message (for example, product order or vote message) through communication channel. Also, the mobile terminal can receive a response to the message through communication channel.

In the multi-screen display mode, the video data of the primary and secondary service channels are displayed in a multiplexed screen image. A call for a program can be made by selecting a screen displaying the target program using a cursor and selecting a call request key provided by the key input unit 170. Since the control unit 100 can recognize the service channel selected by the user on the basis of the position of the cursor, the control unit 100 makes a call to the phone number or IP address provided in association with the program on the selected service channel in response to the user's call request.

As described above, the mobile terminal allows the user to make a call in the broadcast playback mode.

If a switching command for switching the primary and secondary service channels is input while the mobile terminal operates in the multi-screen display mode of the broadcast playback mode, the control unit 100 controls the decoding unit 130 to store the video data of the new primary service channel within the primary output buffer 610 and the audio data of the new primary service channel within the audio output buffer (not illustrated). The control unit 100 also controls the decoding unit 130 to store the video data of the new secondary service channel within the secondary output buffer 611. The multiplexed screen processing unit 140 processes and outputs the video data of the new primary and secondary service channels in the form of multiplexed screen image through the display unit 150. In this case, the audio data of the new primary service channel are output through speaker unit 155 in synchronization with the video data of the new primary service channel. Accordingly, a fast channel switching is possible in the multi-screen display mode.

If a switching command for switching the secondary service channel is input, the control unit 100 controls the multiplexed screen processing unit 140 to output the video data of the previous secondary service channel before a data burst of the new secondary service channel is received while maintaining display of the video data of the primary service channel. Also, the control unit 100 can controls the multiplexed screen processing unit 140 to output only the video data of the primary service channel to be displayed in the full screen view before the data burst of the new secondary service channel is received. Also, the control unit 100 can control such that the channel information on the new secondary service channel such as channel logo, JPEG image, MPEG image, and program information provided in the ESG is displayed in the secondary screen before the data burst of the new secondary service channel is received.

Although the multi-screen display apparatus and method are described with a digital broadcast receiver having a single tuner, the present invention is not limited to the single tuner broadcast receiver. For example, the multi-screen display apparatus and method of the present invention can be implemented with a broadcast receiver equipped with two or more tuners. In the case that the multi-screen display apparatus and method of the present invention is implemented with the digital broadcast receiver equipped with multiple tuner, the control unit buffers the video data received through the multiple tuners and multiplexes the buffered video data so as to display the video data in the multiplexed screen image. At this time, one of the multiple tuners is designated as a primary tuner for receiving broadcast data of a primary channel and the others are designated as secondary tuners for receiving broadcast data of secondary service channels. The primary and secondary tuners can be tuned in accordance with commands input through the key input unit.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims.

As described above, the multi-screen display apparatus and method for a digital broadcast receiver according to the present invention are advantageous to displays video data of at least two service channels at the same time in a multiplexed screen format. The video data of the multiple channels can be displayed in a split screen image composed of screens having the same size or in a PIP screen image composed a primary screen for displaying video data of a primary channel in a full screen format and at least one secondary screen for displaying video data of at least one secondary service channel in a PIP inset screen format. Also, the multi-screen display apparatus and method of the present invention can be implemented with a mobile terminal equipped with a digital broadcast receiver. In this case, the mobile terminal enables making a call, while watching programs on primary and secondary screens, to a call number or IP address provided in association with a program, resulting in interactive broadcast and improvement of utilization of mobile terminal.

What is claimed is:

1. A multi-screen display apparatus for a digital broadcast receiver, comprising:
   a broadcast reception unit for receiving broadcast data of a primary and at least one secondary service channels;
   a decoding unit for output of decoded video and audio data, the decoding unit comprising a video decoder for decoding video data of all types of video frames of the primary service channel and only at least one predetermined type of video frame of the at least one secondary service channel and an audio decoder for decoding audio data of a predetermined service channel, by time frame, wherein the at least one predetermined type of video frame is selected from the group of: i) only I-frames and ii) only I- and P-frames;
   a multiplexing screen processing unit for multiplexing the decoded video data of the primary service channel and the at least one secondary service channels output by the decoding unit;
   a display unit for displaying the multiplexed decoded video data in the form of a multiplexed screen image; and
   a speaker unit for outputting the decoded audio data in the form of audible sound wave;
   wherein the display unit displays a frame selection option for the at least one secondary service channel enabling user selection of a first frame option in which only I-frames are displayed, a second frame option in which only I- and P-frames are displayed, and an option enabling user selection of a specific temporally positioned frame in a frames per second sequence to be displayed.

2. The multi-screen display apparatus of claim 1, wherein the at least one predetermined type of video frame is only I frames.

3. The multi-screen display apparatus of claim 1, wherein the at least one predetermined type of video frame is only I- and P-frames.

4. The multi-screen display apparatus of claim 1, wherein the display unit displays a frame selection option for the at least one secondary service channel enabling user selection of a first frame option in which only I-frames are displayed and a second frame option in which only I- and P-frames are displayed.

5. The multi-screen display apparatus of claim 2, wherein the audio decoder decodes the audio data of the primary service channel.

6. The multi-screen display apparatus of claim 2, wherein the multiplexed screen processing unit comprises:
   a resizer for resizing the video data of the at least one secondary service channel in accordance with a size of at least one secondary screen; and
   a combiner for generating a multiplexed screen image having a primary screen displaying the video data of the primary service channel and the at least one secondary screen displaying the video data of the at least one secondary service channel.

7. The multi-screen display apparatus of claim 6, wherein the multiplexed screen processing unit comprises a position determination unit for determining a position of the at least one secondary screen in relation to the primary screen.

8. The multi-screen display apparatus of claim 7, wherein the resizer perform resizing the video data of the at least one secondary service channel in accordance with a size set by a user.

9. The multi-screen display apparatus of claim 7, wherein the position determination unit determines the position of the at least one secondary screen according to a user command.

10. The multi-screen display apparatus of claim 1, wherein the multiplexed screen processing unit comprises a blender for blending the video data of the at least one secondary service channel weighted by a predetermined weight value with the video data of the primary service channel.

11. The multi-screen display apparatus of claim 1, wherein the multiplexed screen processing unit comprises:
    a position determination unit for determining a position of at least one secondary screen on a display screen of the display unit; and
    a combiner for generating a multiplexed screen image having a primary screen displaying the video data of the primary service channel and the at least one secondary screen displaying the video data of the at least one secondary service channel.

12. The multi-screen display apparatus of claim 1, wherein the multiplexed screen processing unit comprises:
    a resizer for resizing the video data of the primary service channel and the at least one secondary service channel for sizes of a primary and at least one secondary screen, respectively; and
    a combiner for generating a multiplexed screen image including the primary screen and the at least one secondary screen.

13. The multi-screen display apparatus of claim 1, wherein the decoding unit comprising:
    at least two input buffers for storing the video data of the primary service channel and the at least one secondary service channel and output of the stored video data therefrom;
    a multiplexer for multiplexing and output thereof of the video data output from the at least two input buffers;
    a decoding module for decoding and output thereof of the multiplexed video data output by the multiplexer;
    a demultiplexer for demultiplexing the multiplexed video data output by the decoder; and
    at least two output buffers for storing the demultiplexed video data output by the demultiplexer, a first buffer for storing the video data of the primary service channel and at least one second buffer for storing the video data of a corresponding secondary service channel, wherein the at least one second buffer being sized dependent upon the predetermined types of video frame of the at least one secondary service channel.

14. The multi-screen display apparatus of claim 13, wherein the audio decoder decodes the audio data of the primary service channel.

15. The multi-screen display apparatus of claim 1, wherein the video decoder transmits the decoded video data to the multiplexed screen processing unit.

16. The multi-screen display apparatus of claim 1, wherein the digital broadcast receiver is a DVB-H receiver, the broadcast data of the primary service channel and the at least one secondary service channel are received in data bursts, and further comprising a protocol processing unit for extracting video and audio data from the data bursts.

17. The multi-screen display apparatus of claim 13, wherein the multiplexer time-division multiplexes the video data stored in the at least two input buffers by time frame.

18. The multi-screen display apparatus of claim 16, wherein the broadcast reception unit comprises:
 a tuner for receiving a physical channel carrying the primary service channel and the at least one secondary service channel;
 a demodulator for demodulating broadcast signals received through the physical channel;
 a filter for filtering the broadcast signals carried by the primary service channel and the at least one secondary service channel with reference to channel identifiers; and
 a demodulation controller for performing time slicing on the physical channel and error correction on the broadcast signal received through the primary service channel and the at least one secondary service channel.

19. The multi-screen display apparatus of claim 18, wherein the multiplexed screen processing unit comprises:
 a resizer for resizing video data of the at least one secondary service channel in accordance with a size of a secondary screen corresponding thereto; and
 a combiner for generating a multiplexed screen image having a primary screen displaying the video data of the primary service channel and the corresponding secondary screen displaying the resized video data of the at least one secondary service channel.

20. The multi-screen display apparatus of claim 19, wherein the multiplexed screen processing unit further comprises a position determination unit for determining a position of the at least one secondary screen in relation to the primary screen.

21. The multi-screen display apparatus of claim 16, wherein the audio decoder decodes the audio data of the primary service channel.

22. The multi-screen display apparatus of claim 16, wherein the video decoder transmits the decoded video data to the multiplexed screen processing unit.

23. A multi-screen display method for a digital broadcast receiver, comprising:
 receiving data bursts of a primary service channel and at least one secondary service channel by predetermined time duration;
 extracting video and audio data from the received data bursts;
 decoding the extracted video and audio data corresponding to the primary service channel and the at least one secondary service channel, with all types of video frames being decoded for the primary service channel, and only at least one predetermined type of video frame being decoded for the at least one secondary service channel selected from the group of i) only I-frames and ii) only I- and P-frames;
 storing the extracted video data in corresponding buffers, a first buffer for storing the video data of the primary service channel and at least one second buffer for storing the video data of a corresponding secondary service channel, wherein the at least one second buffer is sized dependent upon types of video frames of the at least one secondary service channel;
 multiplexing the extracted video data corresponding to the primary service channel and the at least one secondary service channel;
 displaying the multiplexed video data corresponding to the primary service channel and the at least one secondary service channel in the form of a multiplexed screen image;
 outputting the audio data of the primary service channel in synchronization with the video data of the primary service channel; and
 displaying a frame selection option for the at least one secondary service channel enabling user selection of a first frame option in which only I-frames are displayed, a second frame option in which only I- and P-frames are displayed, and a third frame option enabling user selection of a specific temporally positioned frame in a frames per second sequence to be displayed.

24. The multi-screen display method of claim 23, wherein receiving data bursts further comprises:
 receiving broadcast signals of a physical channel carrying the primary service channel and the at least one secondary service channel;
 demodulating the broadcast signals;
 extracting data bursts of the primary service channel and the at least one secondary service channel from the demodulated broadcast signals.

25. The multi-screen display method of claim 24, wherein displaying the video data further comprises:
 resizing the video data of the at least one secondary service channel in accordance with a size of a corresponding at least one secondary screen;
 generating a multiplexed screen image having a primary screen displaying the video data of the primary service channel and the at least one secondary screen displaying the resized video data of the at least one secondary service channel.

26. The multi-screen display method of claim 25, wherein displaying the video data further comprises determining a position of the at least one secondary screen in relation to the primary screen.

27. The multi-screen display method of claim 26, wherein decoding the video and audio data further comprises:
 time-division multiplexing the buffered video data in units of a video frame;
 decoding the time-division multiplexed video data;
 demultiplexing the decoded video data; and
 buffering the demultiplexed video data for the primary and secondary service channels in respective buffers.

28. The multi-screen display method of claim 27, wherein decoding the video and audio data further comprises decoding the audio data of the primary service channel.

29. A multi-screen display apparatus for a mobile terminal equipped with a digital broadcast receiver, comprising:
 the digital broadcast receiver comprising:
  a broadcast reception unit for receiving data of a primary service channel and at least one secondary service channel in a time frame, a protocol processing unit for extracting video data from the received data, a decoding unit comprising:
  a video decoder for decoding video data of all types of video frames of the primary service channel and only at least one predetermined type of video frame of the at least one secondary service channel; and
  a multiplexed screen processing unit for multiplexing video data output by the decoding unit;

a radio frequency unit for supporting radio communication;

a control unit for controlling the radio frequency unit to process a call received while the multiplexed screen processing unit generates and outputs a multiplexed screen image in a multi-screen display mode;

a display unit for displaying the multiplexed video data, output by the multiplexed screen processing unit, in the form of a multiplexed screen image, with a secondary service channel screen displayed in the form of a picture-in-picture (PIP) inset screen; and wherein when the secondary screen displayed in the form of the PIP inset screen is selected and an outgoing call is requested, the control unit controls the radio frequency unit to establish a communication channel on the basis of information provided through the secondary service channel associated with the selected secondary screen.

30. The multi-screen display apparatus of claim 29, wherein the at least one predetermined type of video frame is selected from the group of: i) only I-frames and ii) only I- and P-frames.

31. The multi-screen display apparatus of claim 29, wherein the video decoder including a first buffer for storing the video data of the primary service channel and at least one second buffer for storing the video data of a corresponding secondary service channel, wherein the at least one second buffer being sized dependent upon the predetermined type of video frame of the at least one secondary service channel.

32. The multi-screen display apparatus of claim 29, wherein when an incoming call is detected in the multi-screen display mode, the control unit controls the display unit to display information on a caller and an incoming call alert.

33. The multi-screen display apparatus of claim 29, wherein when an outgoing call request is detected in the multi-screen display mode, the control unit controls the radio frequency unit to transmit a call request.

34. The multi-screen display apparatus of claim 29, wherein when a screen of the primary service channel is selected and an outgoing call is requested, the control unit controls, the radio frequency unit to establish a communication channel on the basis of information provided through the primary service channel.

35. The multi-screen display apparatus of claim 29, wherein the video decoder outputs the decoded video data to the multiplexed screen processing unit.

36. A multi-screen display method for a digital broadcast receiver, comprising:
  receiving data bursts of a primary service channel and at least one secondary service channel by predetermined time duration;
  extracting video and audio data from the received data bursts;
  determining whether the video data of the at least one secondary service channel is at least one predetermined type of video frame every time duration, selected from the group of: i) only I-frames and ii) only I- and P-frames;
  when the video data of the at least one secondary service channel is the predetermined type of video frame,
    decoding the video data of the primary service channel and the at least one secondary service channel and the audio data of a predetermined service channel,
    storing the decoded video data of the primary service channel in a first buffer;
    storing the decoded video data of the at least one secondary service channel in a corresponding second buffer sized dependent upon the predetermined type of video data in the at least one secondary service channel;
    multiplexing the decoded video data of the primary service channel and the at least one secondary service channel, and
    displaying the video data of the primary service channel and the at least one secondary service channels in the form of a multiplexed screen image, with a secondary service channel screen displayed in the form of a picture-in-picture (PIP) inset screen;
  when the video data of the at least one secondary service channel is not the predetermined type of video frame,
    decoding only the video and audio data of the primary service channel, and
    displaying the video data of the primary service channel;
  outputting the audio data of the primary service channel in synchronization with the video data of the primary service channel;
  detecting a selection of the secondary service channel screen displayed in the form of the PIP insert screen and an outgoing call request, and in response, establishing a communication channel on the basis of information provided through the secondary service channel associated with the selected secondary screen.

37. The multi-screen display method of claim 36, wherein the at least one predetermined type of video frame is only I-frames.

38. The multi-screen display method of claim 36, wherein the at least one predetermined type of video frame is only I- and P-frames.

39. The multi-screen display method of claim 36, wherein receiving data bursts comprises:
  receiving broadcast signals of a physical channel carrying the primary service channel and the at least one secondary service channel;
  demodulating the received broadcast signals;
  extracting data bursts of the primary service channel and the at least one secondary service channel from the demodulated broadcast signals.

40. The multi-screen display method of claim 39, wherein displaying the video data further comprises:
  resizing the video data of the at least one secondary service channel in accordance with a size of a corresponding secondary screen;
  generating a multiplexed screen image having a primary screen displaying the video data of the primary service channel and the corresponding secondary screen displaying the resized video data of the at least one secondary service channel.

41. The multi-screen display method of claim 40, wherein displaying the video data further comprises determining a position of the corresponding secondary screen of each at least one secondary service channel in relation to the primary screen.

42. The multi-screen display method of claim 39, wherein the step of decoding the video and audio data further comprises:

buffering the video data of the primary service channel and the at least one secondary service channel in respective buffers;

time-division multiplexing the buffered video data in a unit of a video frame;

decoding the time-division multiplexed video data;

demultiplexing the decoded video data; and buffering the demultiplexed video data for the primary service channel and the at least one secondary service channel in respective buffers.

43. The multi-screen display method of claim 42, wherein decoding the video and audio data further comprises decoding the audio data of the primary service channel.

44. The multi-screen display method of claim 36, wherein the digital broadcast receiver is within a mobile terminal, and the data bursts of the primary service channel and at least one secondary service channel are received in a multi-screen display mode of the mobile terminal.

45. The multi-screen display method of claim 44, wherein the at least one predetermined type of video frame is only I-frames.

46. The multi-screen display method of claim 44, wherein the at least one predetermined type of video frame is only I-frames and P-frames.

47. The multi-screen display method of claim 44, further comprising displaying a frame selection option for the at least one secondary service channel enabling user selection of a first frame option in which only I-frames are displayed, a second frame option in which only I- and P-frames are displayed, and a third frame option enabling user selection of a specific temporally positioned frame in a frames per second sequence to be displayed.

48. A multi-screen display method for a digital broadcast receiver, comprising:

receiving data of a primary service channel and at least one secondary service channel;

extracting video and audio data from the received data, decoding the video data of the primary and secondary service channels in a unit of a video frame, wherein all types of video data are decoded for the primary channel, and only at least one predetermined type of video data is decoded for the at least one secondary service channel selected from the group of: i) only I-frames and ii) only I- and P-frames;

multiplexing the decoded video data of the primary service channel and the at least one secondary service channel, displaying the decoded video data of the primary service channel and the at least one secondary service channel in the form of a multiplexed screen image, and outputting the decoded audio data; and displaying a frame selection option for the at least one secondary service channel enabling user selection of a first frame option in which only I-frames are displayed, a second frame option in which only I- and P-frames are displayed, and a third frame option enabling user selection of a specific temporally positioned frame in a frames per second sequence to be displayed.

49. The multi-screen display method of claim 48, further comprising the step of when one of the screens is selected and an outgoing call is requested, establishing a communication channel on the basis of information provided through the service channel associated with the selected screen.

50. A multi-screen display method for a mobile terminal equipped with a digital broadcast receiver, comprising:

receiving data bursts of a primary service channel and at least one secondary service channel by predetermined time duration, extracting video and audio data from the received data bursts, decoding the video data of the primary and secondary service channels in a unit of a video frame, wherein all types of video data are decoded for the primary channel, and only at least one predetermined type of video data is decoded for the at least one secondary service channel selected from the group of: i) only I-frames and ii) only I- and P-frames;

storing the decoded video data of the at least one secondary service channel in a corresponding buffer sized dependent upon the predetermined type of video data in the at least one secondary service channel;

multiplexing the decoded video data of the primary service channel and the at least one secondary service channel, displaying the decoded video data of the primary service channel and the at least one secondary service channel in the form of a multiplexed screen image of selectable screens, and outputting the audio data;

displaying a frame selection option for the at least one secondary service channel enabling user selection of a first frame option in which only I-frames are displayed, a second frame option in which only I- and P-frames are displayed, and a third frame option enabling user selection of a specific temporally positioned frame in a frames per second sequence to be displayed;

resizing the video data of the at least one secondary service channel in accordance with a size set by a user, with a position of the at least one secondary screen determined according to a user command;

when an incoming call is detected in the multi-screen display mode, displaying information about a caller and an incoming call alert; and when an outgoing call request is detected in the multi-screen display mode, transmitting a call request.

* * * * *

UNITED STATES PATENT AND TRADEMARK OFFICE
CERTIFICATE OF CORRECTION

| | |
|---|---|
| PATENT NO. | : 8,949,924 B2 |
| APPLICATION NO. | : 11/827045 |
| DATED | : February 3, 2015 |
| INVENTOR(S) | : Jeong Wook Seo et al. |

It is certified that error appears in the above-identified patent and that said Letters Patent is hereby corrected as shown below:

In the Claims

Column 32, Claim 8, Line 22 should read as follows:
--...the resizer performs resizing...--

Column 36, Claim 36, Line 30 should read as follows:
--...the PIP inset screen...--

Signed and Sealed this
Twelfth Day of May, 2015

Michelle K. Lee
*Director of the United States Patent and Trademark Office*